US012264807B2

(12) United States Patent
Vidakovic et al.

(10) Patent No.: US 12,264,807 B2
(45) Date of Patent: Apr. 1, 2025

(54) MOUNTING ACCESSORIES FOR LUMINAIRES

(71) Applicant: SIGNIFY HOLDING B.V., Eindhoven (NL)

(72) Inventors: Voya Vidakovic, Marietta, GA (US); Jason Quentin Paulsel, Peachtree City, GA (US); Russell Green, Douglasville, GA (US)

(73) Assignee: SIGNIFY HOLDING, B.V., Eindhoven (NL)

(*) Notice: Subject to any disclaimer, the term of this patent is extended or adjusted under 35 U.S.C. 154(b) by 0 days.

(21) Appl. No.: 18/713,804

(22) PCT Filed: Nov. 22, 2022

(86) PCT No.: PCT/EP2022/082815
§ 371 (c)(1),
(2) Date: May 28, 2024

(87) PCT Pub. No.: WO2023/099285
PCT Pub. Date: Jun. 8, 2023

(65) Prior Publication Data

US 2025/0020314 A1 Jan. 16, 2025

Related U.S. Application Data

(60) Provisional application No. 63/284,257, filed on Nov. 30, 2021.

(30) Foreign Application Priority Data

Dec. 20, 2021 (EP) .................................... 21215808

(51) Int. Cl.
*F21V 21/04* (2006.01)
*F21S 8/02* (2006.01)
*F21V 21/116* (2006.01)

(52) U.S. Cl.
CPC ............ *F21V 21/047* (2013.01); *F21S 8/026* (2013.01); *F21V 21/116* (2013.01); *F21V 21/044* (2013.01); *F21V 21/046* (2013.01)

(58) Field of Classification Search
CPC .... F21V 21/047; F21V 21/044; F21V 21/046; F21S 8/026
USPC .......................................................... 362/365
See application file for complete search history.

(56) References Cited

U.S. PATENT DOCUMENTS 10,132,477 B1 11/2018 Winters
10,900,642 B2 1/2021 Green et al.
11,530,778 B1 * 12/2022 Presz-Lafreniere ......................... F21V 23/001
2014/0140075 A1 5/2014 Schmitt et al.
2018/0017239 A1 1/2018 Liu et al.
2018/0306416 A1 * 10/2018 Zeng ....................... F21V 21/18
2019/0178453 A1 * 6/2019 Zeng ..................... F21V 23/002
(Continued)

FOREIGN PATENT DOCUMENTS

DE 102019005713 A1 2/2021
JP 2021082403 A 5/2021
(Continued)

*Primary Examiner* — Laura K Tso

(57) ABSTRACT

A luminaire assembly can include an enclosure top, and adapter coupled to the enclosure top, and a mounting accessory coupled to the adapter, where the mounting accessory is configured to secure the enclosure top to a structure.

8 Claims, 16 Drawing Sheets

(56) References Cited

U.S. PATENT DOCUMENTS

| | | | | |
|---|---|---|---|---|
| 2020/0378583 | A1 | 12/2020 | Cheng et al. | |
| 2022/0120413 | A1* | 4/2022 | Li | F21V 17/104 |

FOREIGN PATENT DOCUMENTS

| | | | |
|---|---|---|---|
| KR | 20200077216 | A | 6/2020 |
| WO | 2014183968 | A1 | 11/2014 |

* cited by examiner

MOUNTING ACCESSORIES FOR LUMINAIRES

CROSS-REFERENCE TO PRIOR APPLICATIONS

This application is the U.S. National Phase application under 35 U.S.C. § 371 of International Application No. PCT/EP2022/082815, filed on Nov. 22, 2022, which claims the benefit of European Patent Application No. 21215808.3, filed on Dec. 20, 2021, and U.S. Application No. 63/284,257, filed Nov. 30, 2021. These applications are hereby incorporated by reference herein.

TECHNICAL FIELD

The present disclosure relates generally to recessed luminaires, and more particularly to systems, methods, and devices for mounting accessories for luminaires.

BACKGROUND

Recessed luminaires are mostly hidden from view once installed, with most of a recessed luminaire being positioned above a ceiling or other part of a structure. Different mounting systems (e.g., torsion springs) are available to secure a recessed luminaire in place upon installation. Some recessed luminaire systems include a can (a type of housing), in which case the recessed luminaire is secured to the inside of the can. In other cases, where recessed luminaire systems do not include a can, the recessed luminaire can be secured against a structure (e.g., a ceiling tile, drywall).

SUMMARY

In general, in one aspect, the disclosure relates to a luminaire assembly that includes an enclosure top, an adapter coupled to the enclosure top, and a mounting accessory coupled to the adapter, where the mounting accessory is configured to secure the enclosure top to a structure.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments.

The elements and features shown in the drawings are not necessarily to scale, emphasis instead being placed upon clearly illustrating the principles of the example embodiments. Additionally, certain dimensions or positions may be exaggerated to help visually convey such principles.

Figure 1:
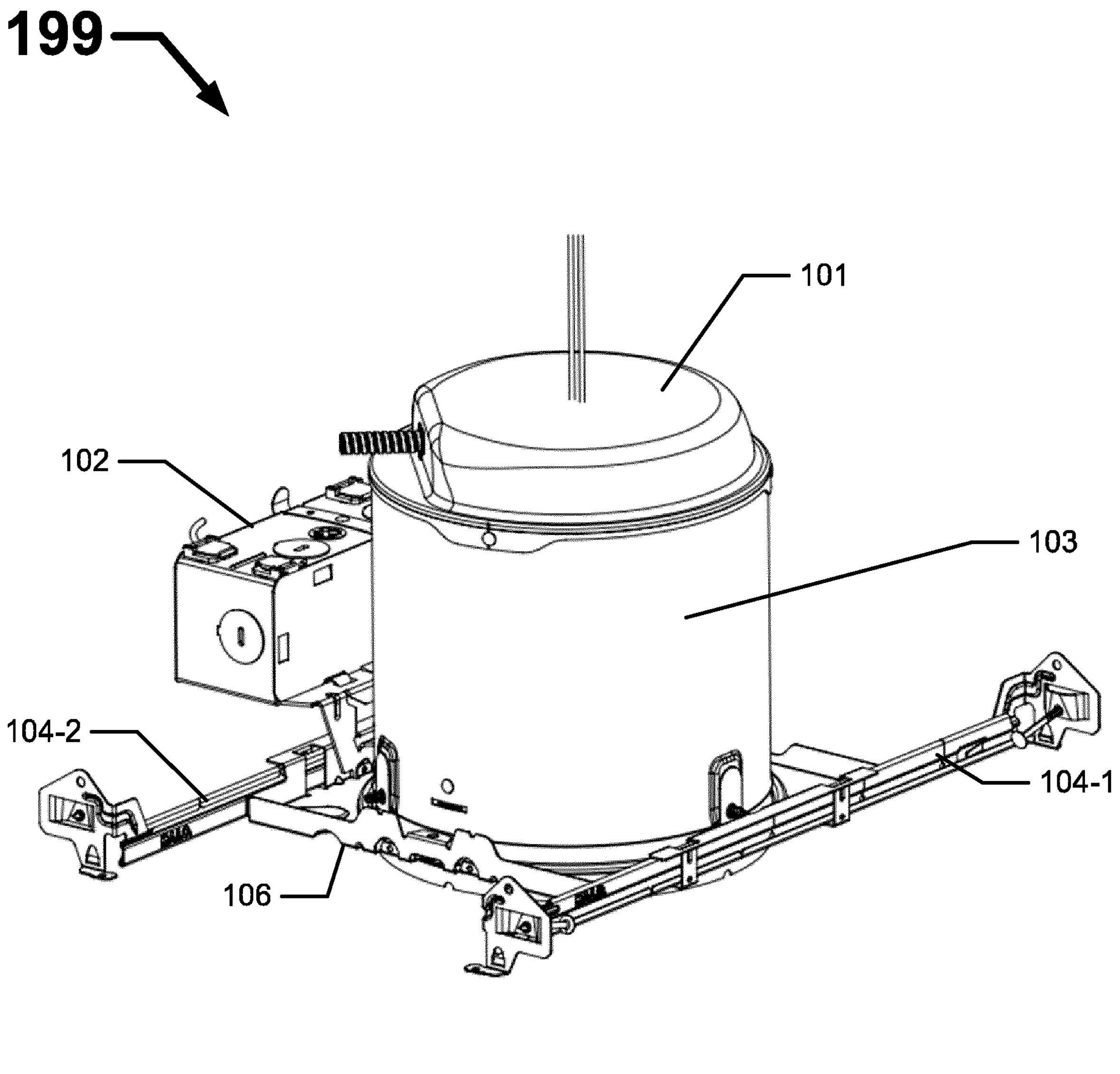

In the drawings, reference numerals designate like or corresponding, but not necessarily identical, elements.

FIG. 1 shows a perspective view of a luminaire assembly with which example mounting accessories can be used.

Figure 2A:
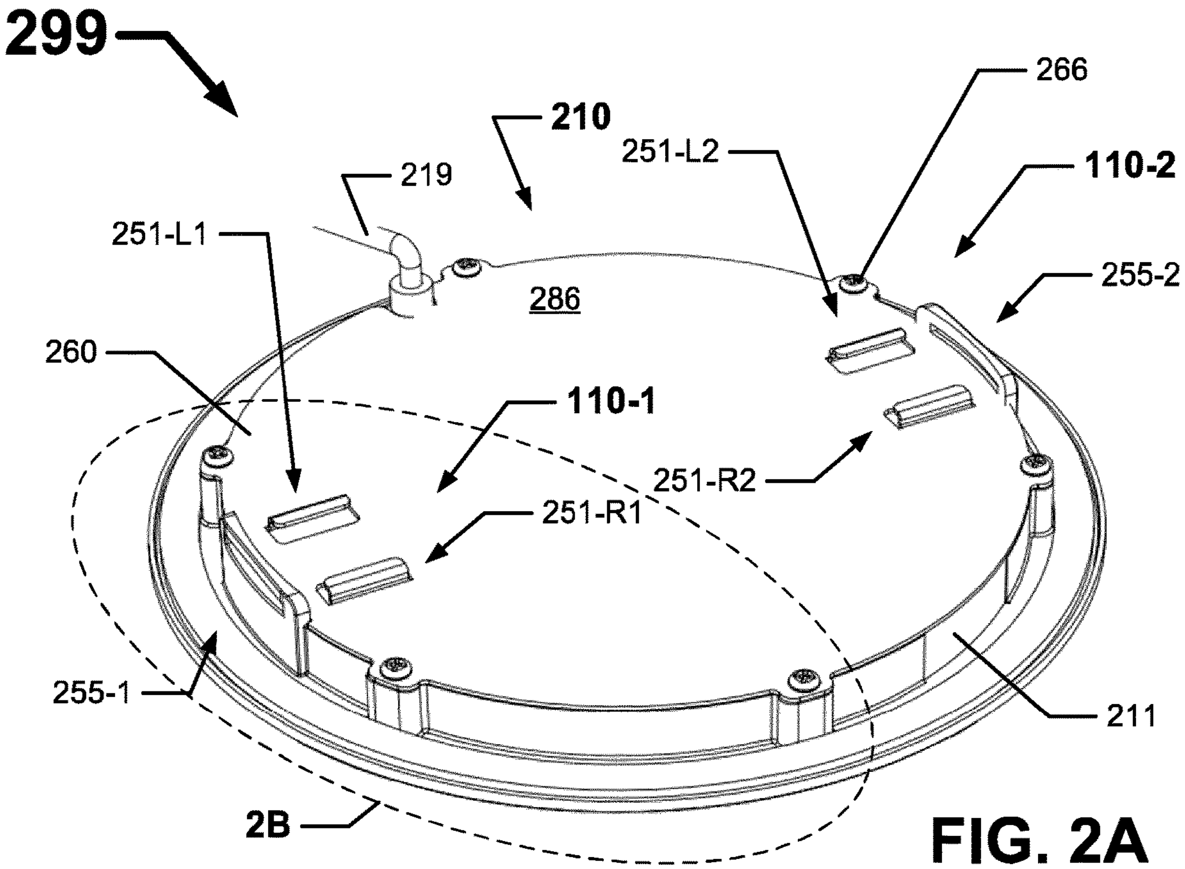
Figure 2B:
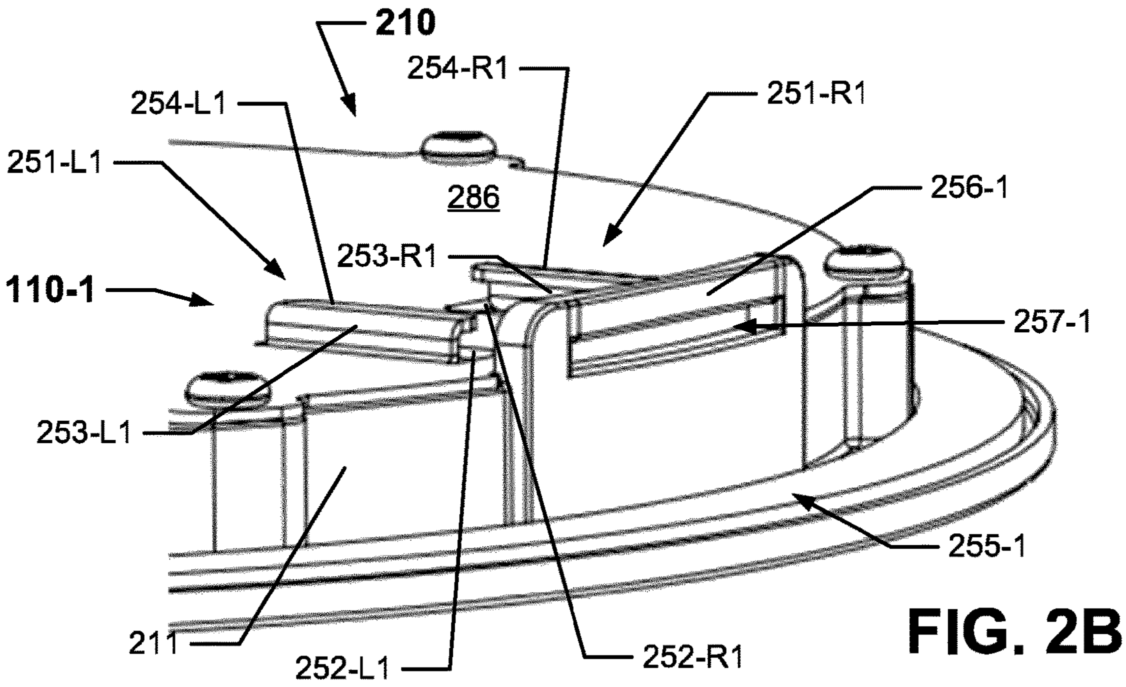

FIGS. 2A and 2B show a subassembly of a luminaire that is configured to receive mounting accessories according to certain example embodiments.

Figure 3A:
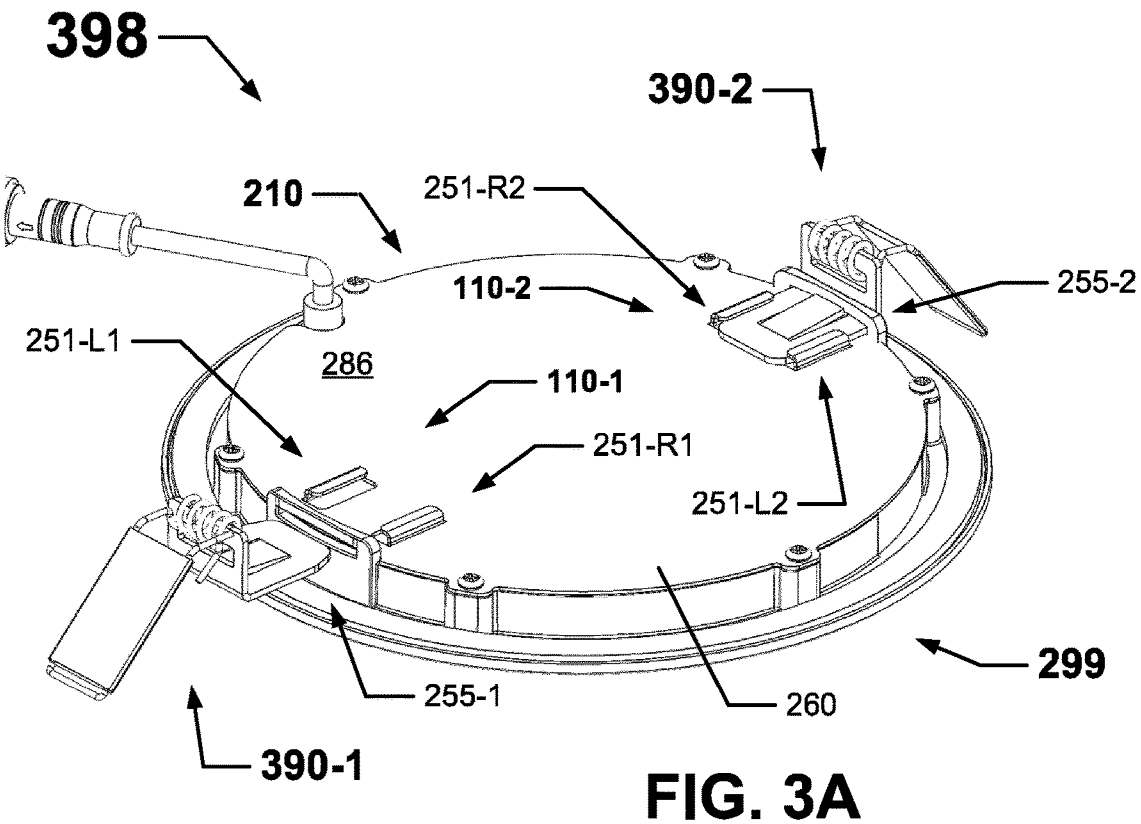
Figure 3B:
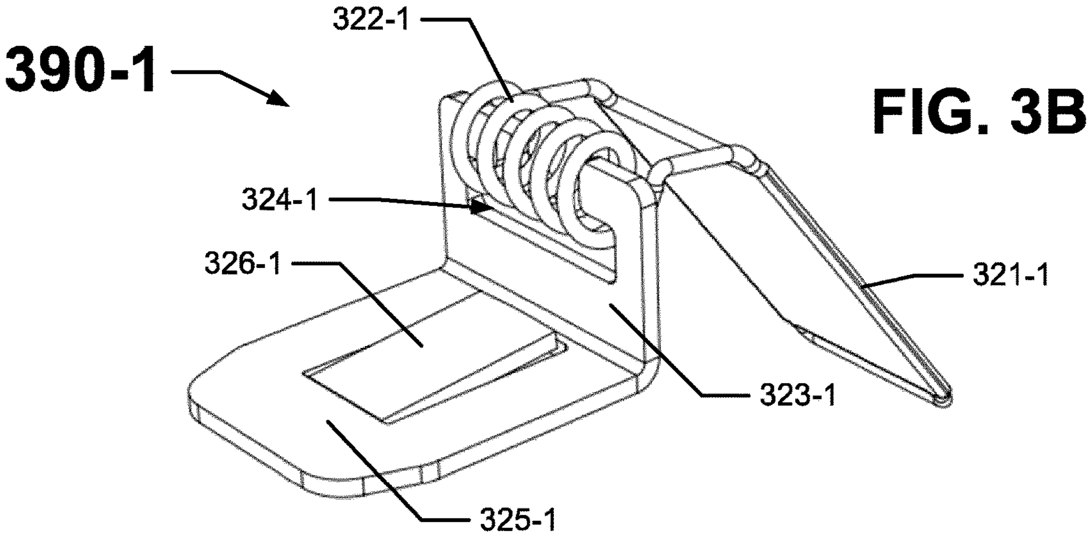

FIGS. 3A and 3B show a subassembly that includes mounting accessories using the subassembly of FIGS. 2A and 2B according to certain example embodiments.

Figure 4A:
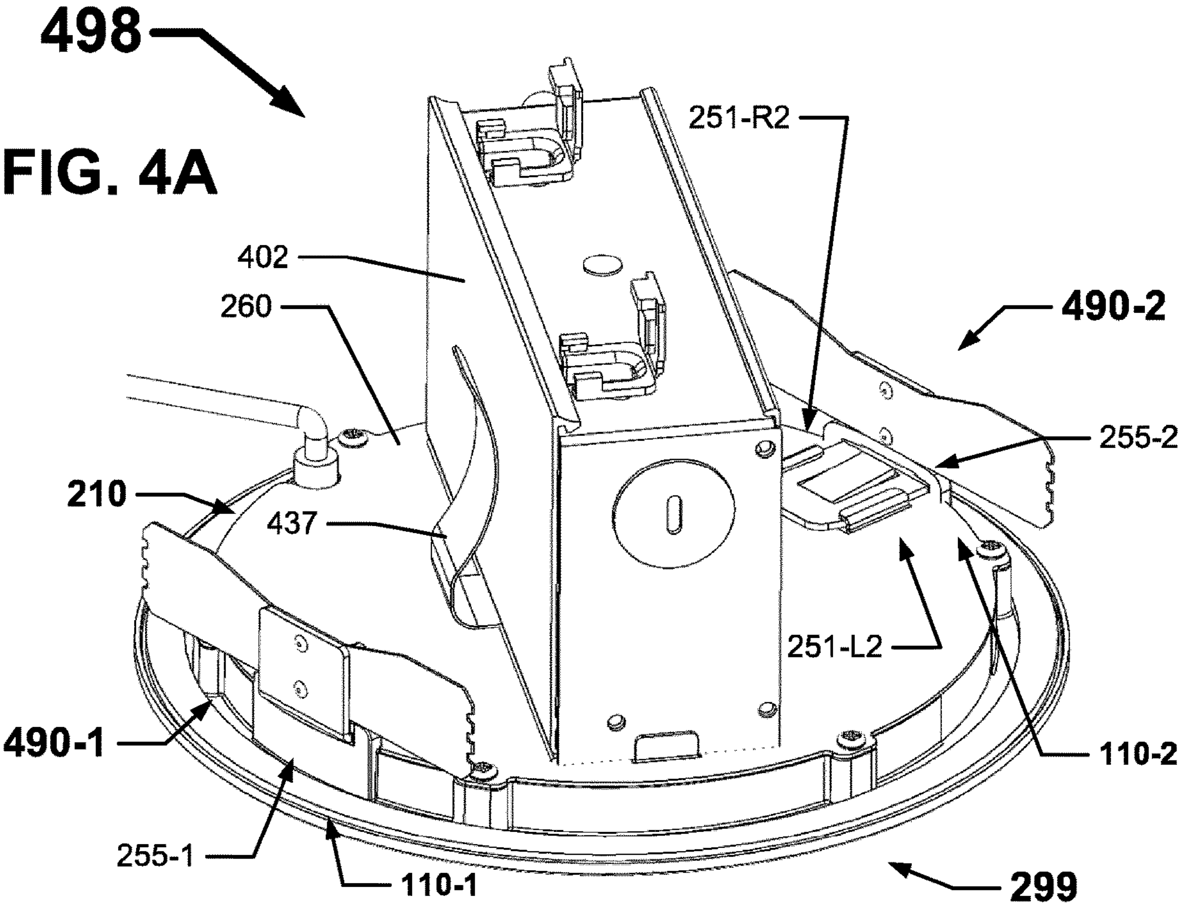
Figure 4B:
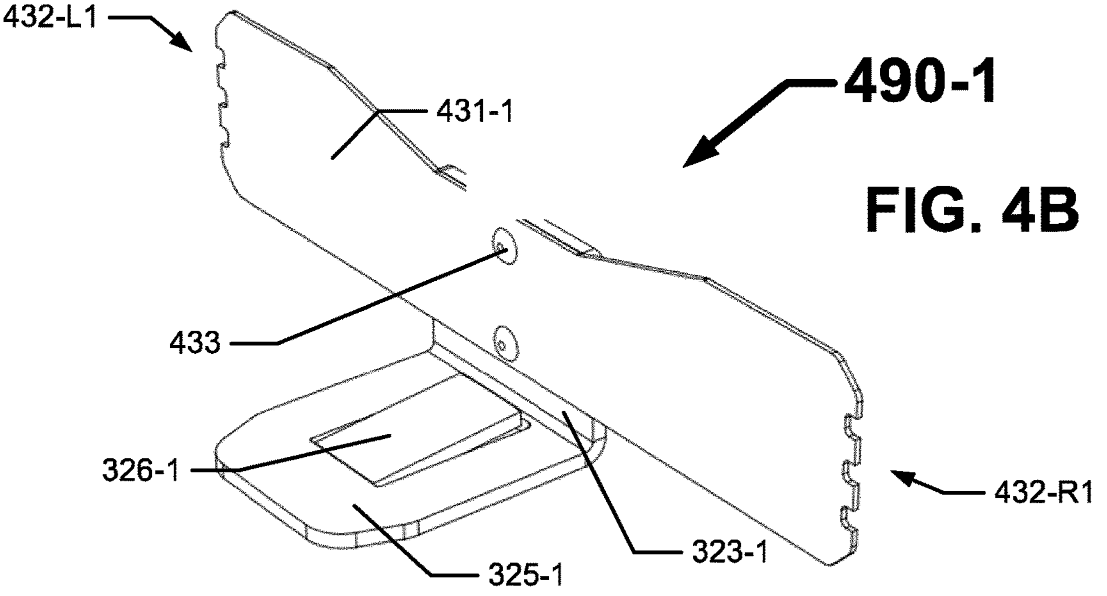

FIGS. 4A and 4B show another subassembly that includes mounting accessories using the subassembly of FIGS. 2A and 2B according to certain example embodiments.

Figure 5A:
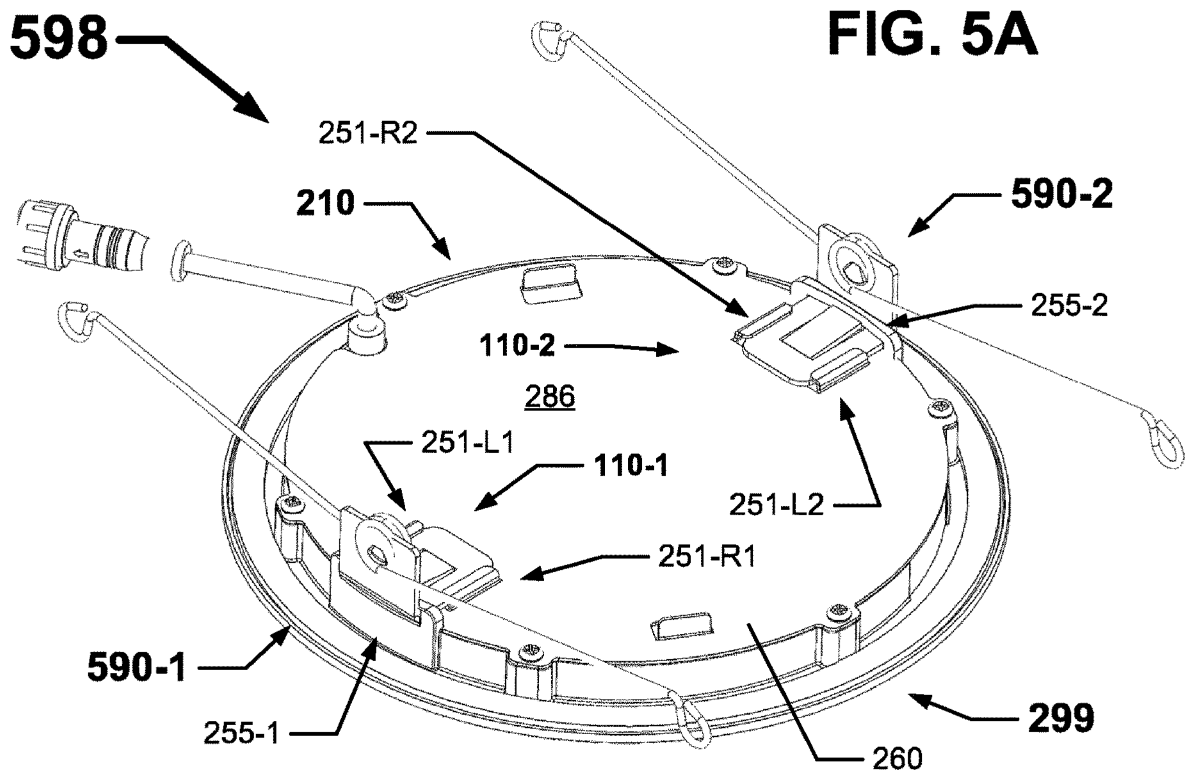
Figure 5B:
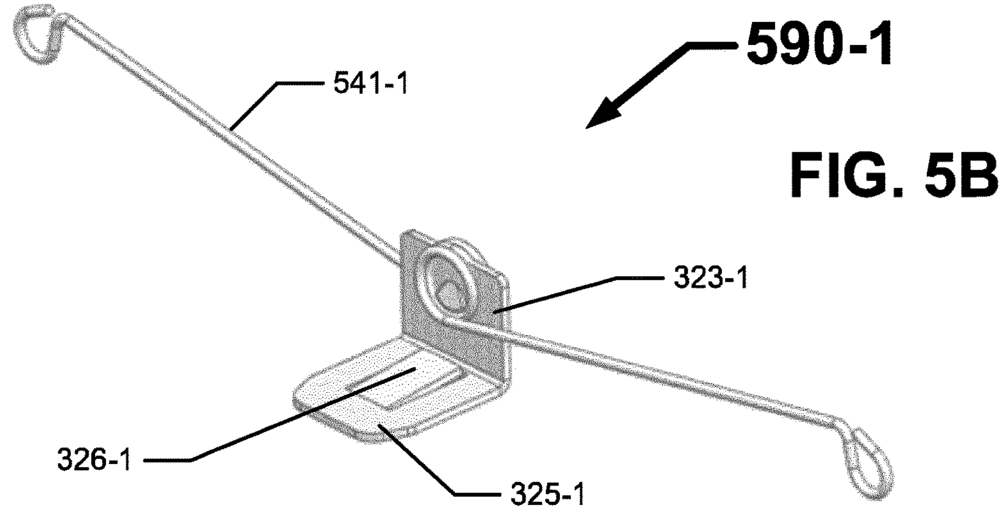

FIGS. 5A and 5B show yet another subassembly that includes mounting accessories using the subassembly of FIGS. 2A and 2B according to certain example embodiments.

FIGS. 6A through 6D show various views of an adapter that includes mounting accessories according to certain example embodiments.

Figure 7A:
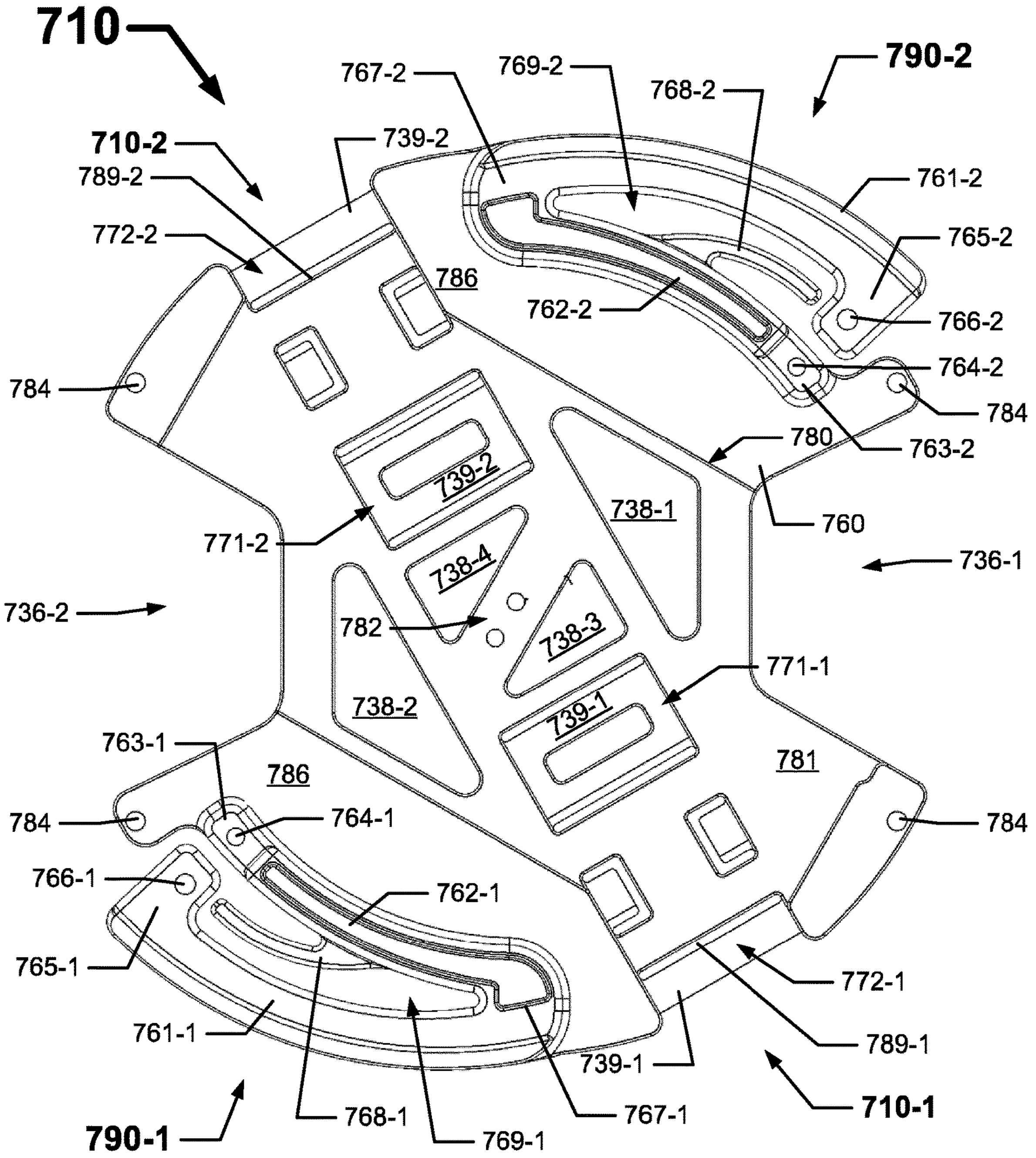
Figure 7B:
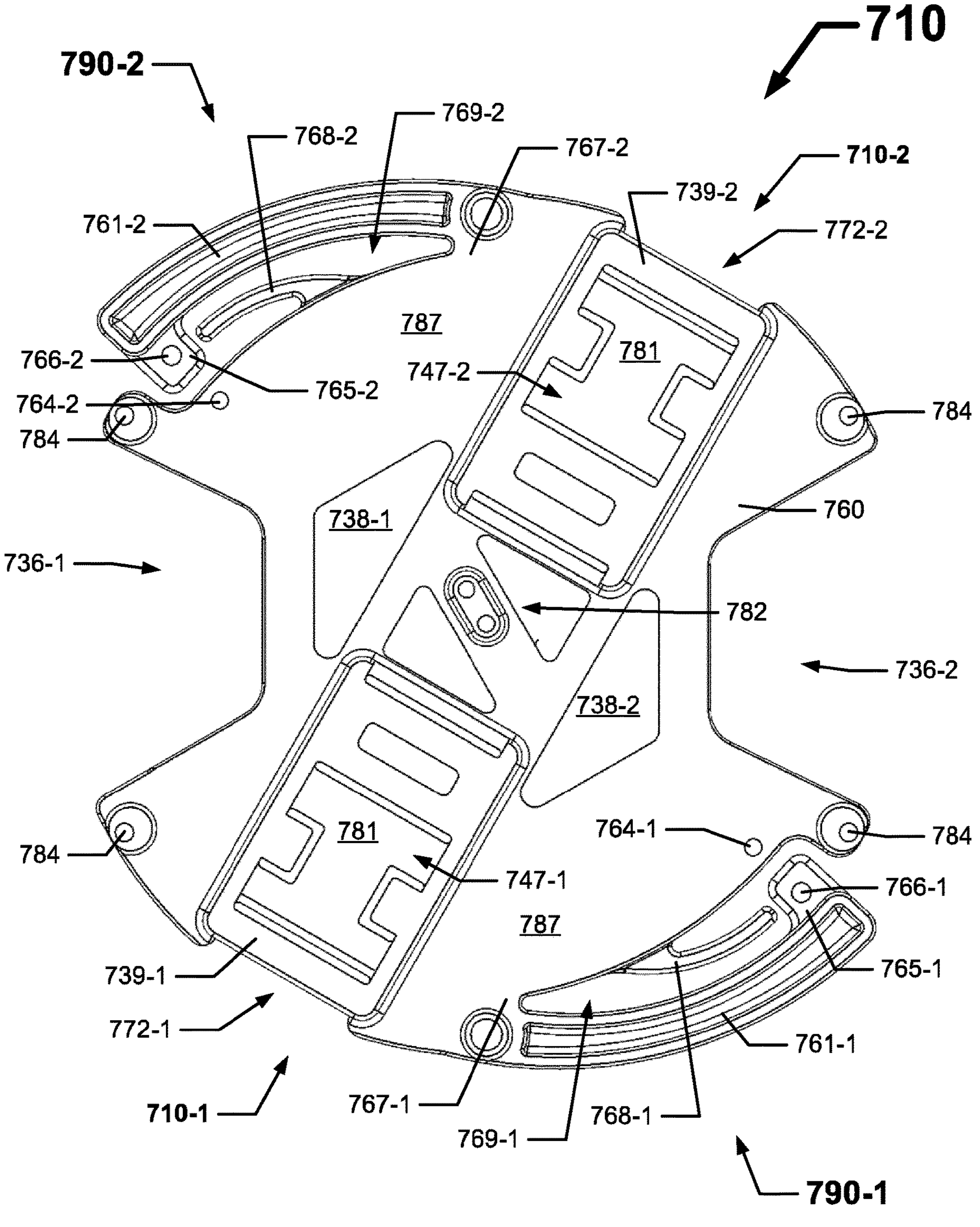

FIGS. 7A and 7B show various views of another adapter that includes mounting accessories according to certain example embodiments.

Figure 8A:
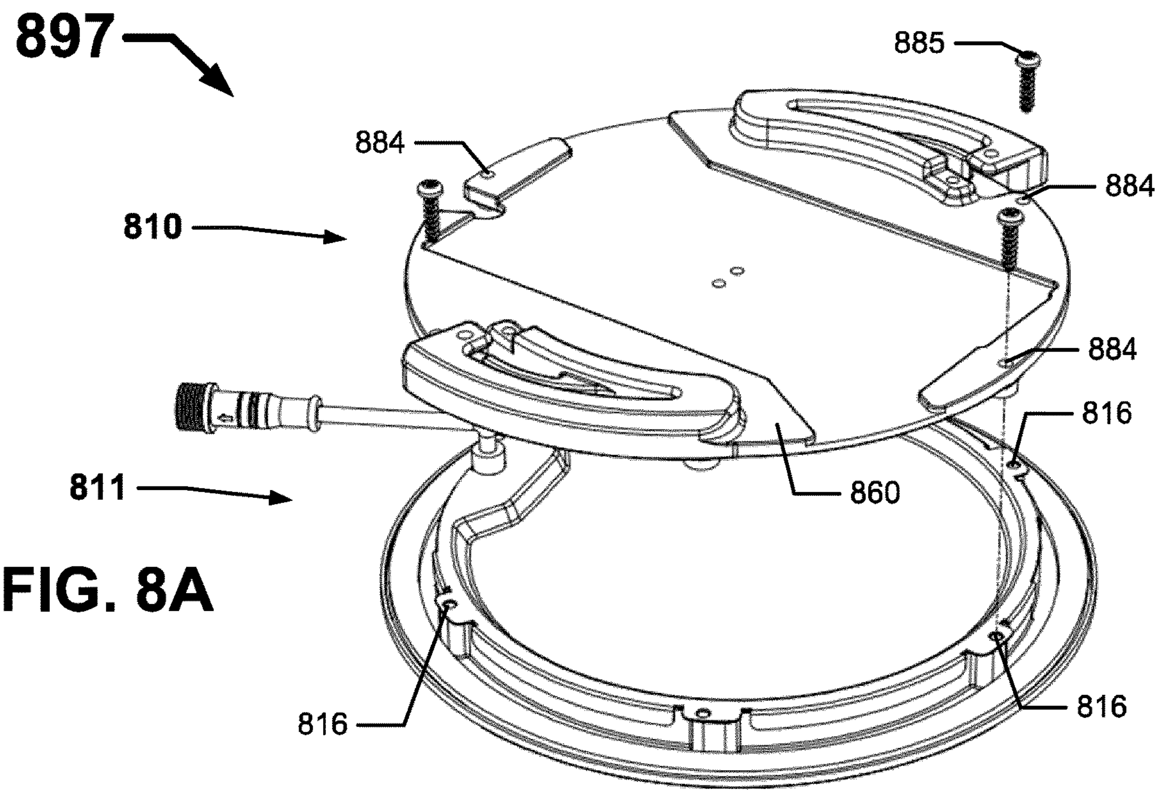
Figure 8B:
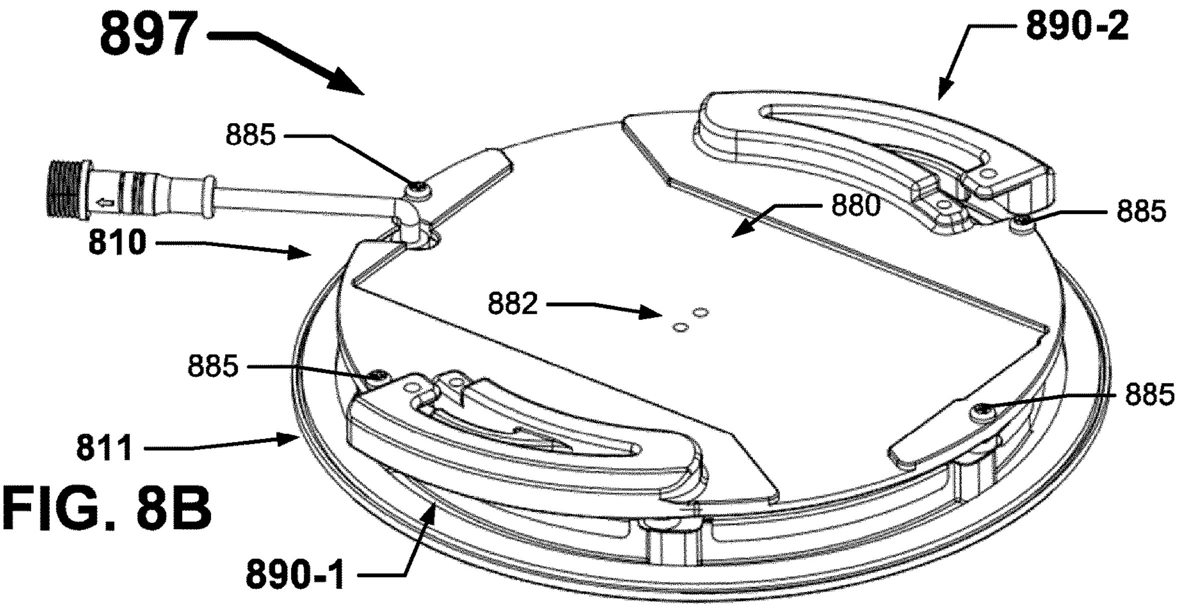

FIGS. 8A and 8B show various views of a subassembly that includes an adapter according to certain example embodiments.

Figure 9:
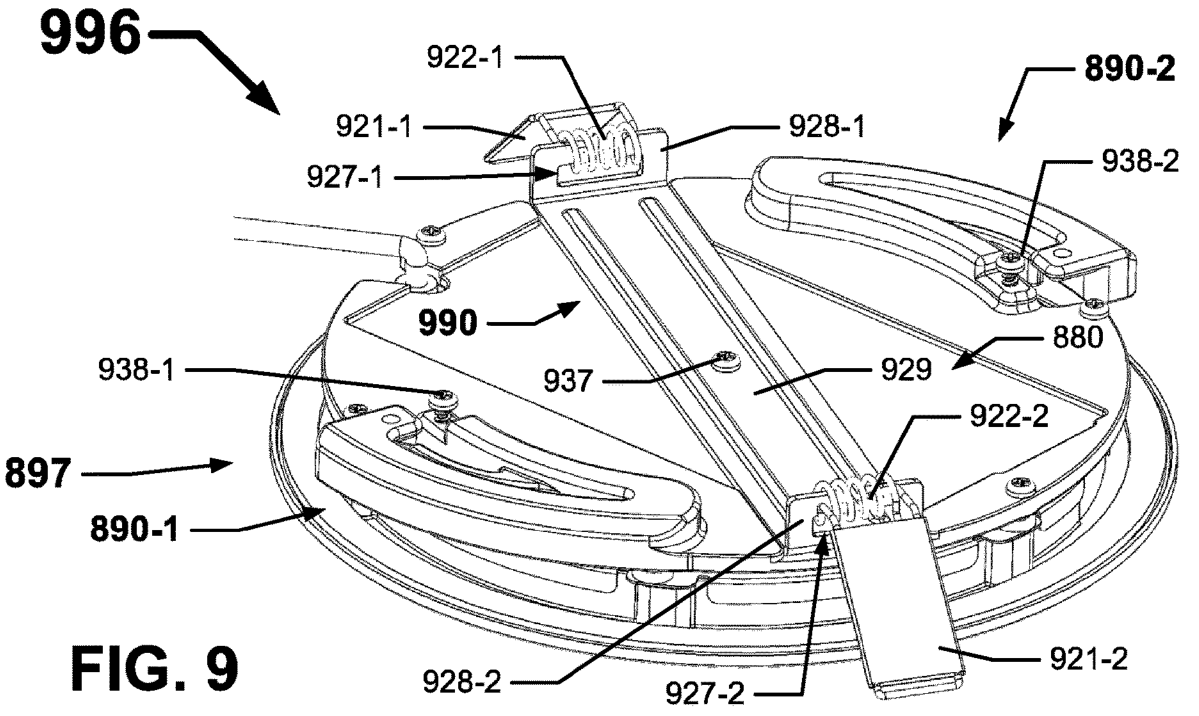

FIG. 9 shows another subassembly that includes the subassembly of FIGS. 8A and 8B.

Figure 10:
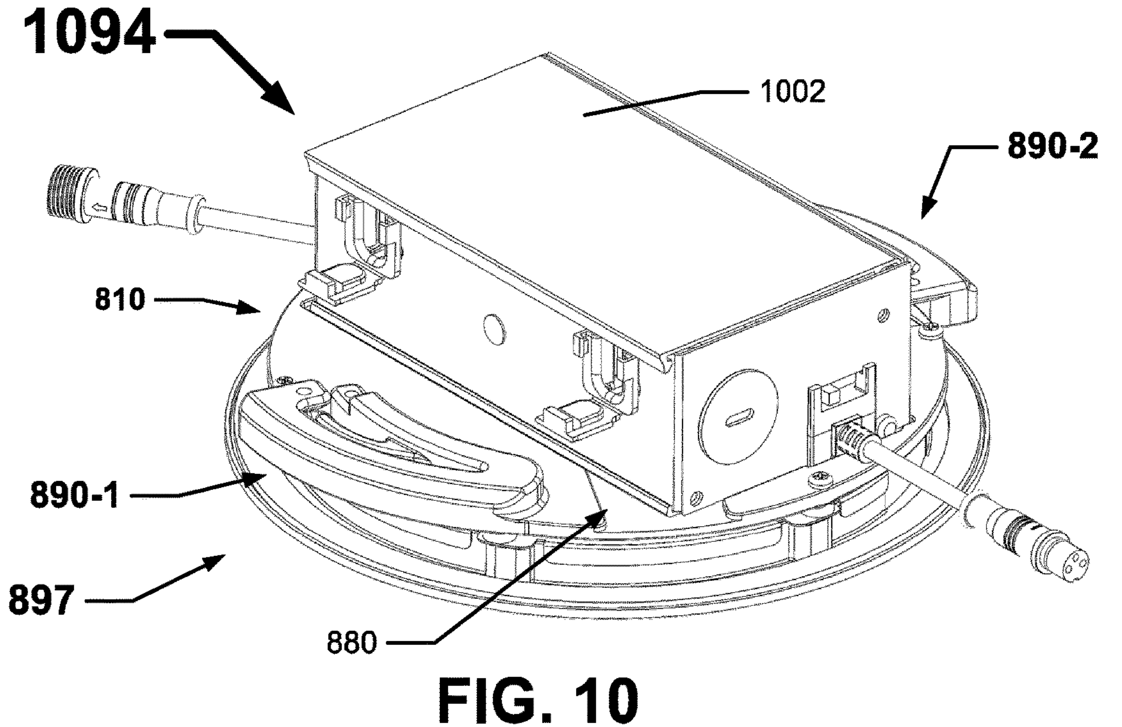

FIG. 10 shows yet another subassembly that includes the subassembly of FIGS. 8A and 8B.

Figure 11A:
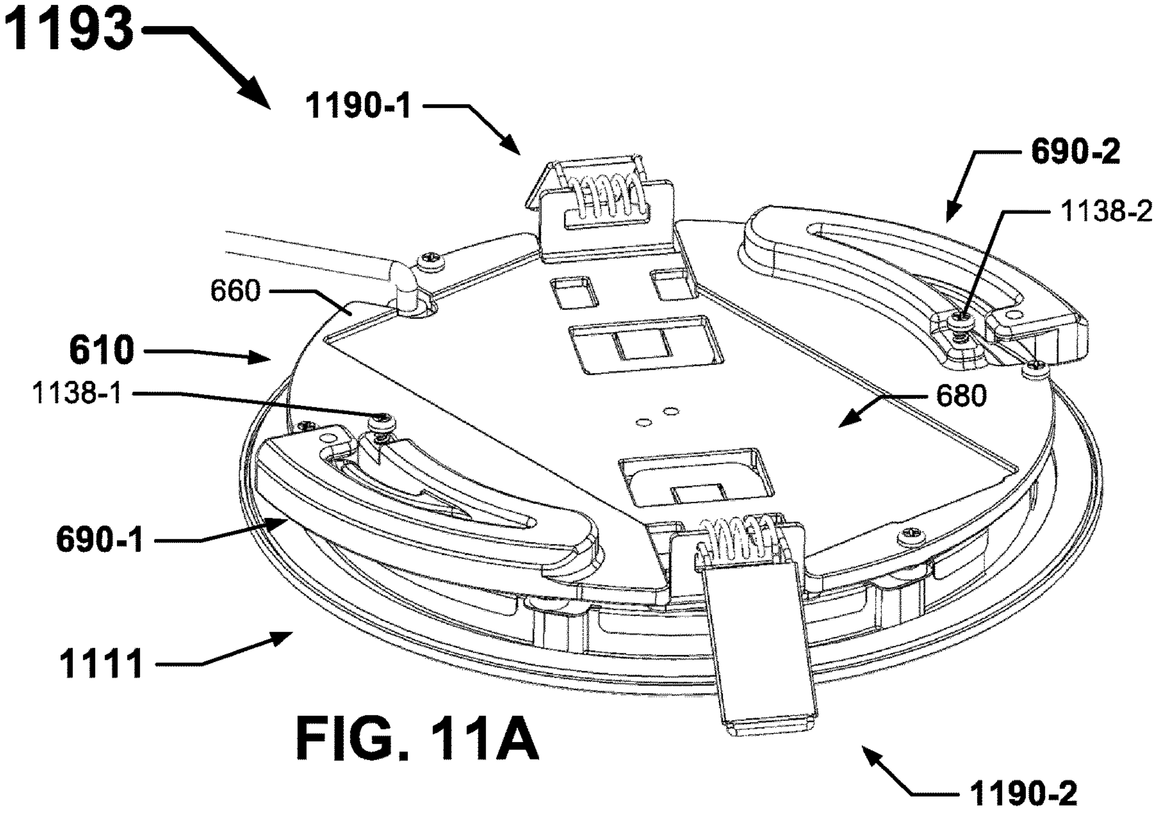
Figure 11B:
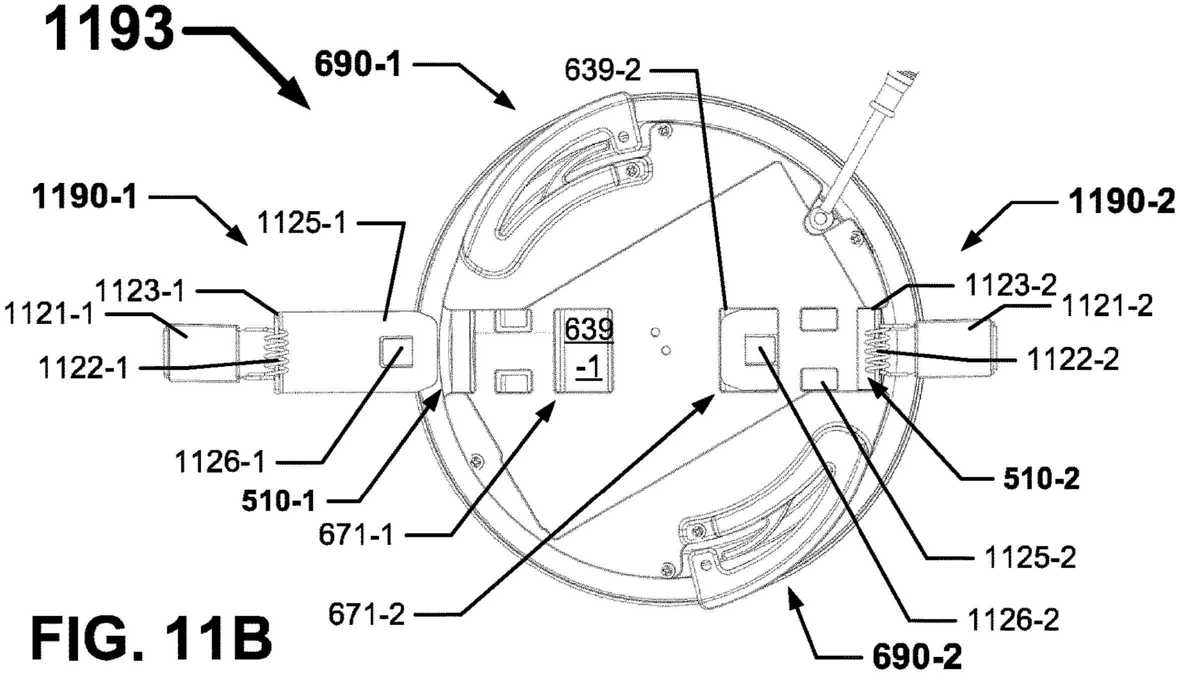

FIGS. 11A and 11B show various views of still another subassembly according to certain example embodiments.

Figure 12:
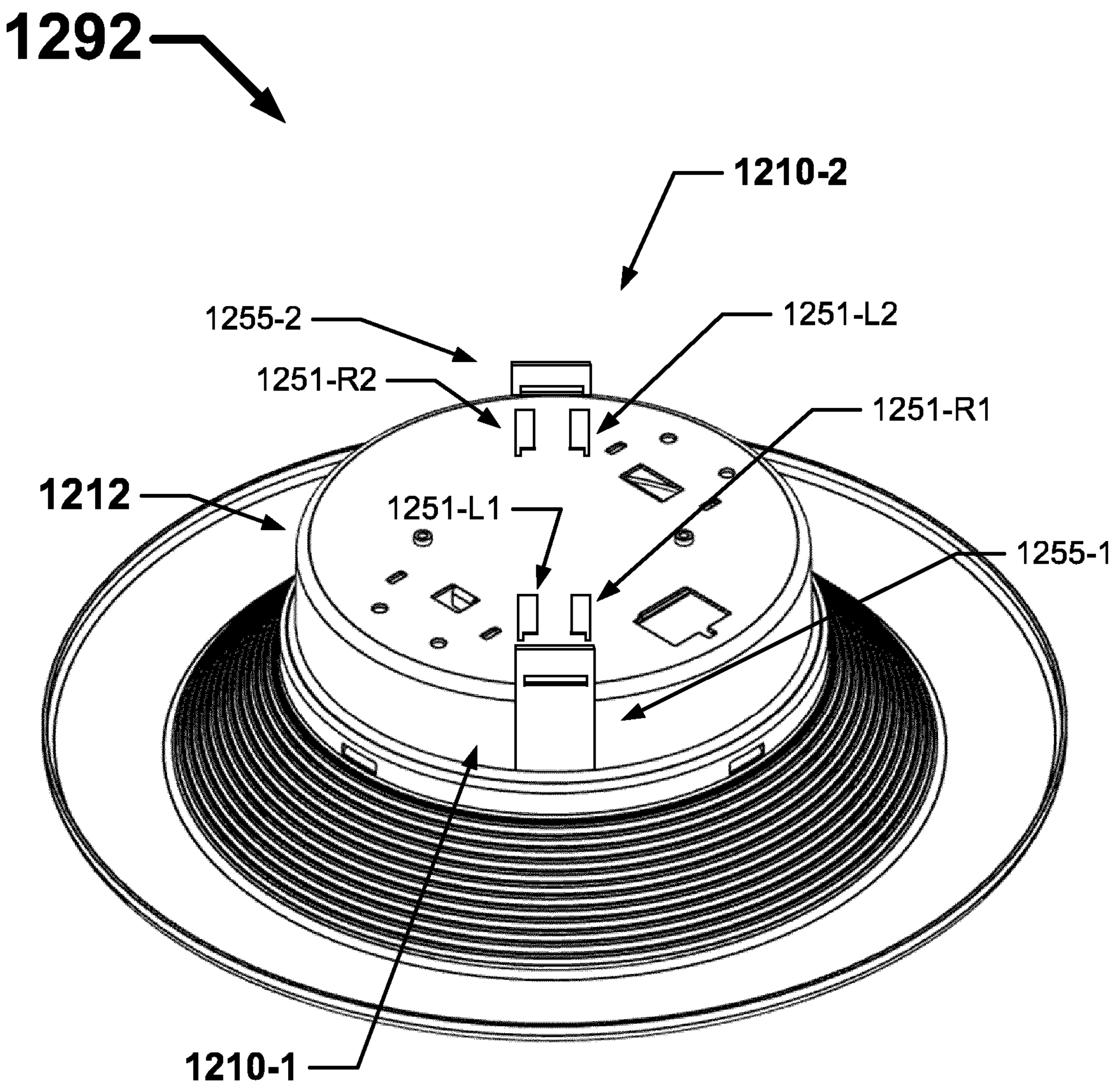

FIG. 12 shows yet another subassembly according to certain example embodiments.

Figure 13:
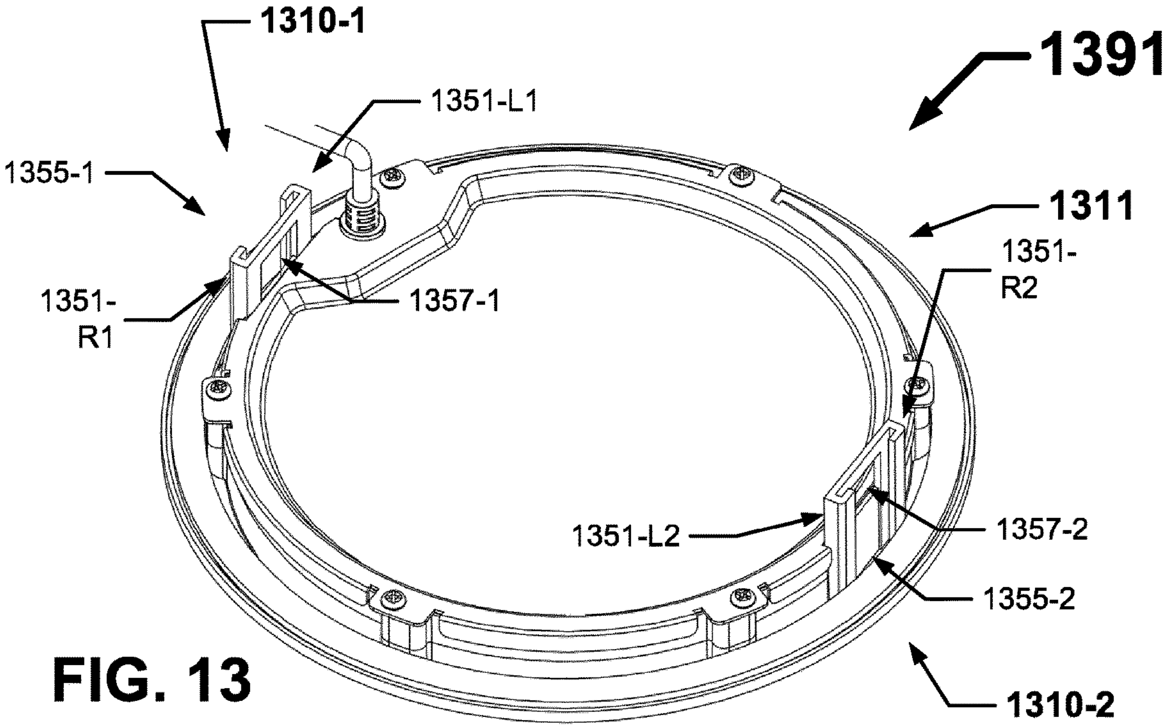

FIG. 13 shows a subassembly of a luminaire that is configured to receive mounting accessories according to certain example embodiments.

Figure 14:
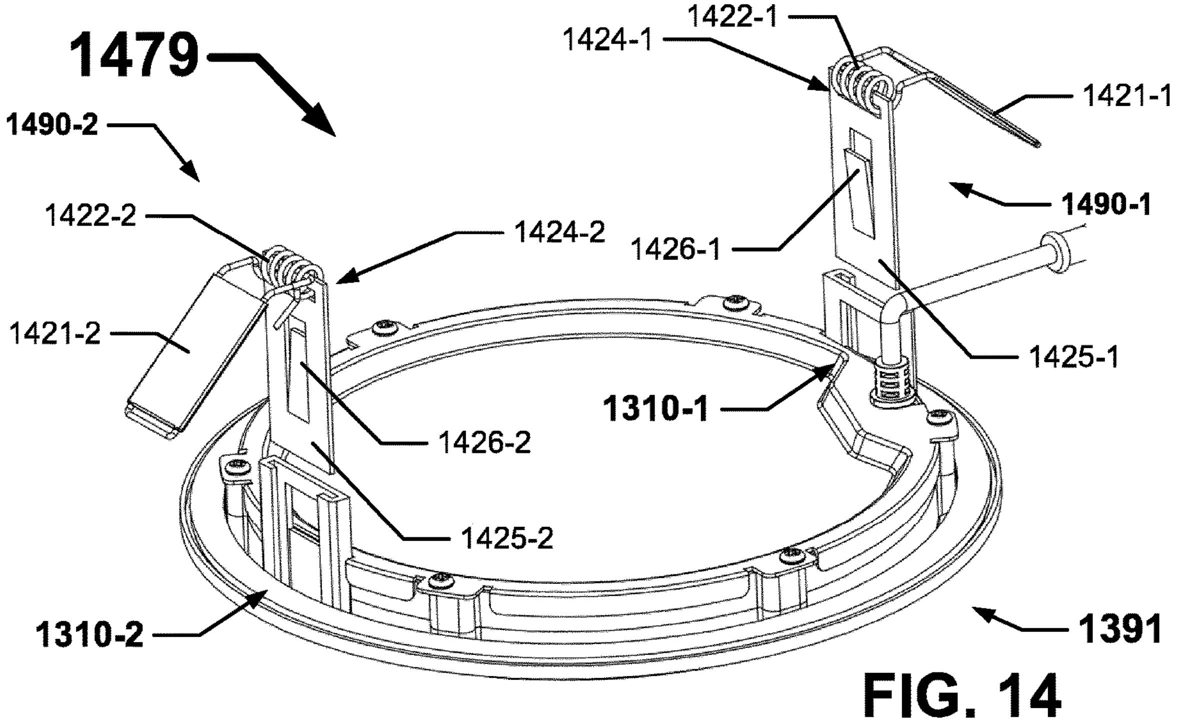

FIG. 14 shows a subassembly that includes mounting accessories using the subassembly of FIG. 13 according to certain example embodiments.

Figure 15:
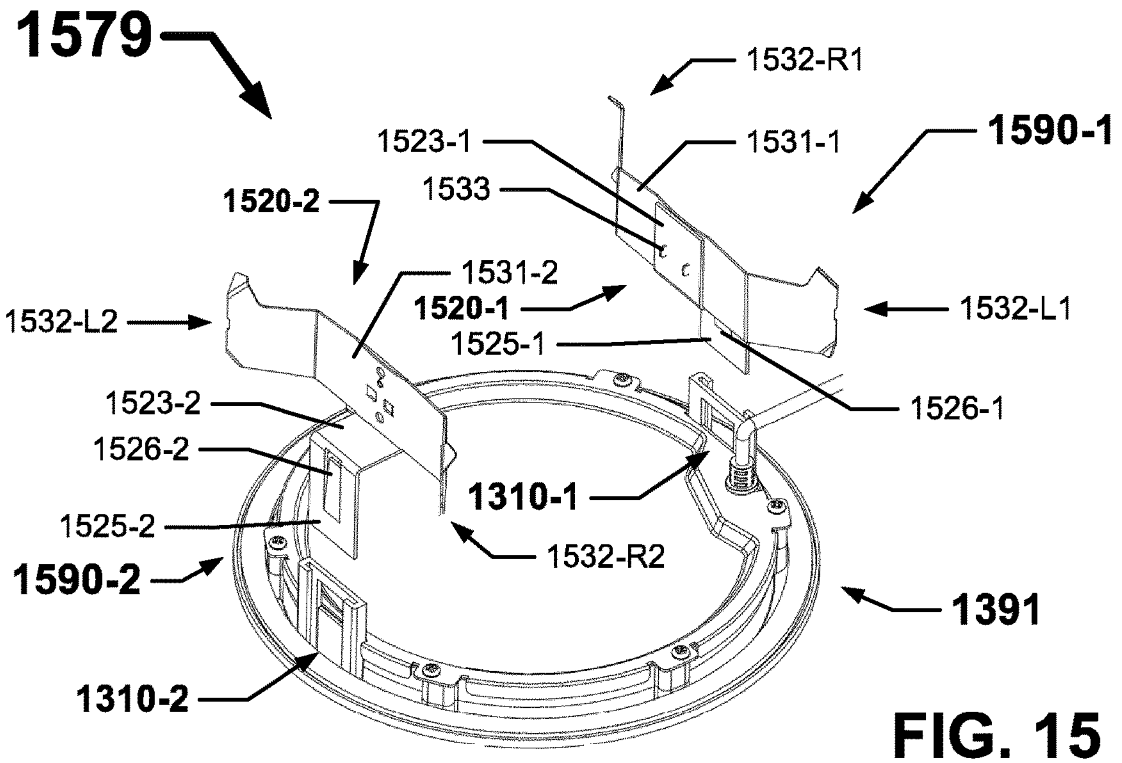

FIG. 15 shows another subassembly that includes mounting accessories using the subassembly of FIG. 13 according to certain example embodiments.

Figure 16:
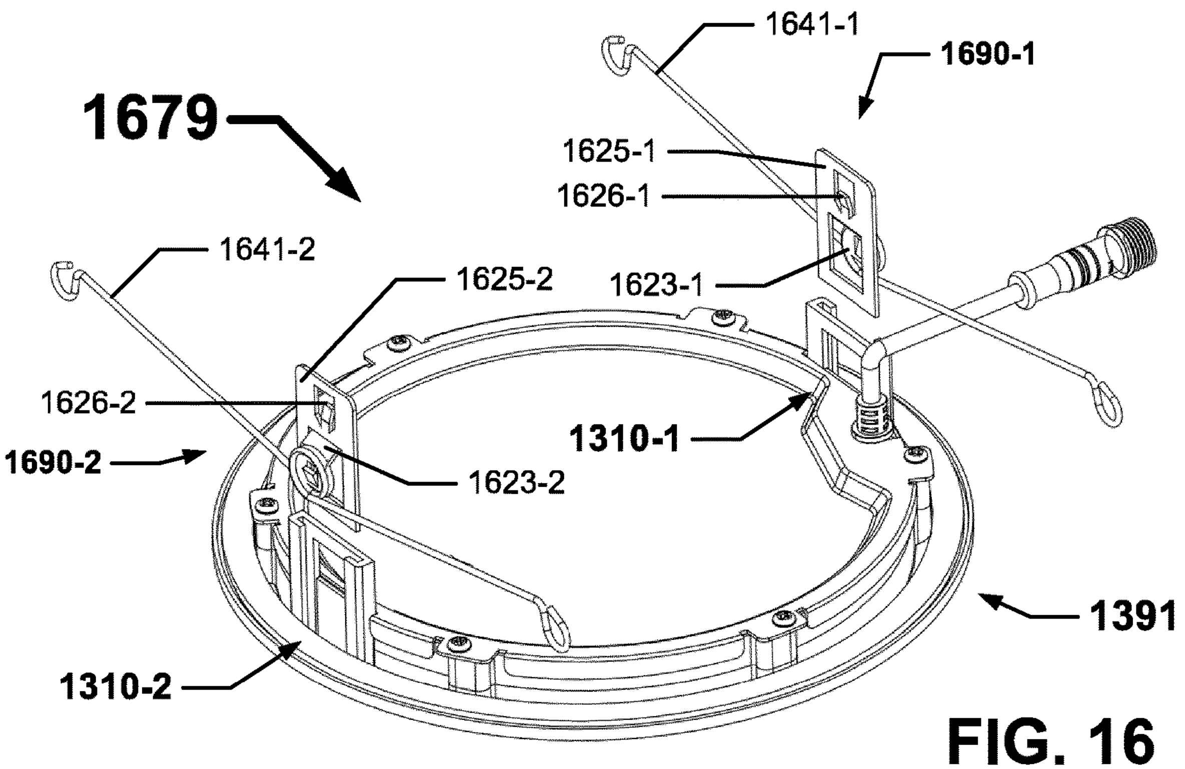

FIG. 16 shows yet another subassembly that includes mounting accessories using the subassembly of FIG. 13 according to certain example embodiments.

DETAILED DESCRIPTION

In general, example embodiments provide systems, methods, and devices for mounting accessories for luminaires. Example embodiments can provide a number of benefits. Such benefits can include, but are not limited to, fewer parts to keep in inventory, avoidance of added costs (e.g., material damage and repair) when changing or repairing portions of a recessed luminaire, modularity, user control, and tool-less configurability. Example embodiments can be used with new luminaires or retrofit with existing luminaires. Luminaires can include light fixtures, lighting devices, and/or lighting systems. While example embodiments described herein are directed to recessed luminaires, example embodiments can be used with any other type of luminaire, including but not limited to pendent lights and troffers.

Luminaires with example mounting accessories can be located in one or more of any of a number of environments. Examples of such environments can include, but are not limited to, indoors, outdoors, a parking garage, a kitchen or cooking space, a hallway, an entertainment room, an office space, a manufacturing plant, a warehouse, and a storage facility, any of which can be climate-controlled or non-climate-controlled. In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill.

Luminaires with example mounting accessories can be integrated into any of a number of different structures. Such structures can include, but are not limited to, a pole, an I-beam, drywall, wood studs, a tree, a wall, ceiling tile, another component (e.g., a can) of a luminaire assembly, and a building facade. A user may be any person that interacts with luminaires. Examples of a user may include, but are not limited to, an engineer, an electrician, an instrumentation and controls technician, a mechanic, an operator, a property manager, a homeowner, a tenant, an employee, a consultant, a contractor, and a manufacturer's representative.

Example mounting accessories for luminaires include one or more adapters. As defined herein, an adapter can be or include one or more of any of a number of components or assemblies that are not part of a conventional luminaire and that are coupled directly to an existing component (e.g., a heat sink, an enclosure top) of a luminaire. As shown below, examples of an adapter can include, but are not limited to, a plate and some or all of a loop and rail assembly. In some cases, as shown and discussed below, an adapter can include one or more additional adapters. In some cases, an additional adapter can be described herein as an adapter.

Luminaires with example mounting accessories (including components thereof) can be made of one or more of a number of suitable materials to allow the luminaire to meet certain standards and/or regulations while also maintaining durability in light of the one or more conditions under which the luminaires and/or other associated components of the luminaire can be exposed. Examples of such materials can include, but are not limited to, aluminum, stainless steel, fiberglass, glass, plastic, polymer, ceramic, and rubber.

Example mounting accessories, or portions thereof, described herein can be made from a single piece (as from a mold, injection mold, die cast, or extrusion process). In addition, or in the alternative, example mounting accessories can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting against, in communication with, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example mounting accessory to become coupled, directly or indirectly, to a structure (e.g., a ceiling tile, drywall, a housing of a luminaire, a frame of the luminaire, some other component of the mounting accessory). A coupling feature can include, but is not limited to, a clamp, a portion of a hinge, an aperture, a recessed area, a protrusion, a hole, a slot, a tab, a detent, and mating threads. One portion of an example mounting accessory can be coupled to a structure (e.g., a ceiling tile, drywall, a housing of a luminaire, a frame of a luminaire, some other component of the mounting accessory) by the direct use of one or more coupling features.

In addition, or in the alternative, a portion of an example mounting accessory can be coupled to a structure (e.g., a ceiling, drywall, a housing of a luminaire, a frame of a luminaire, some other component of a luminaire assembly) using one or more independent devices that interact with one or more coupling features disposed on a component of the mounting accessory. Examples of such devices can include, but are not limited to, a pin, a hinge, a fastening device (e.g., a bolt, a screw, a rivet), epoxy, glue, adhesive, and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of mounting accessories for luminaires, one or more of the components shown may be omitted, repeated, and/or substituted. Accordingly, example embodiments of mounting accessories for luminaires should not be considered limited to the specific arrangements of components shown in any of the figures. For example, features shown in one or more figures or described with respect to one embodiment can be applied to another embodiment associated with a different figure or description.

In certain example embodiments, luminaires having example mounting accessories are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures, wiring, and electrical connections. Use of example embodiments described herein meet (and/or allow the luminaire to meet) such standards when applicable.

If a component of a figure is described but not expressly shown or labeled in that figure, the label used for a corresponding component in another figure can be inferred to that component. Conversely, if a component in a figure is labeled but not described with respect to that figure, the description for such component can be substantially the same as the description for a corresponding component in another figure. The numbering scheme for the various components in the figures herein is such that each component is a three-digit number or a four-digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of mounting accessories for luminaires will be described more fully hereinafter with reference to the accompanying drawings, in which example embodiments of mounting accessories for luminaires are shown. Mounting accessories for luminaires may, however, be embodied in many different forms and should not be construed as limited to the example embodiments set forth herein. Rather, these example embodiments are provided so that this disclosure will be thorough and complete, and will fully convey the scope of mounting accessories for luminaires to those of ordinary skill in the art. Like, but not necessarily the same, elements (also sometimes called components) in the various figures are denoted by like reference numerals for consistency.

Terms such as "first", "second", "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. Such terms are not meant to denote a preference or a particular orientation. Such terms are not meant to limit embodiments of mounting accessories for luminaires. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a perspective view of part of a luminaire assembly 199 with which example mounting accessories can be used. The part of the luminaire assembly 199 shown in FIG. 1 can be installed by being disposed in an aperture in a structure (e.g., a ceiling). As a result, most of the luminaire assembly 199 is positioned in a volume of space (e.g., a plenum space) above the structure, while the remainder of the luminaire assembly 199 is in a different volume of space (e.g., a room) below the structure.

Referring to FIG. 1, the luminaire assembly 199 can include, for example, a housing top 101 (sometimes called a can top 101), a housing 103 (sometimes called a can 103), a frame 106, a junction box 102, and one or more luminaire assembly mounting features 104. The luminaire assembly 199 can also include any of a number of other components that are hidden from view (e.g., disposed inside the can 103), including but not limited to an example adapter, example mounting accessories, and an enclosure top, both discussed below. In alternative embodiments, one or more components of the luminaire assembly 199 shown in FIG. 1 can be removed. For example, a luminaire assembly can be without the can 103, the frame 106, the housing top 101, or the luminaire assembly mounting features 104.

The mounting feature 104 can have any features and configurations to mount the rest of the luminaire to one or more structures (e.g., a wall, a ceiling, a piece of wood, a post, another component of the luminaire assembly 199). In this example, each of the luminaire assembly mounting features 104 (in this example, luminaire assembly mounting feature 104-1 and luminaire assembly mounting feature 104-2) includes one or more hanger bars and one or more hanger bar fasteners. A hanger bar fastener can be mechanically coupled to each end of a hanger bar and can be mechanically coupled to a structure (e.g., a wall, a piece of wood, a metal frame, a concrete pillar) that is used to support the luminaire assembly 199.

The can 103 can have any shape and/or size appropriate for mechanically coupling to the frame 106. The can 103 can be used to enclose one or more of a number of components of the luminaire assembly 199. Such components can include, but are not limited to, a power source (e.g., a driver, a ballast), one or more light sources, a fan, a lens, an enclosure top, and example mounting accessories. The can 103 can have a can top 101, disposed at the top and/or at some other location on the can 103, to provide access within the can 103.

The junction box 102 can house one or more of a number of electrical components. Such electrical components can include, but are not limited to, an electrical wire, a terminal block, a circuit board, a power source, a battery, a switch, and a controller. The electrical components inside the junction box 102 can be coupled to another component of a luminaire disposed within a cavity formed by the can 103. The junction box 102 can be mounted to the frame 106.

The frame 106 can include at least one piece. The frame 106 can be mechanically coupled to one or more of the luminaire assembly mounting features 104. In this case, one side of the frame 106 is coupled to luminaire assembly mounting feature 104-1, and the other side of the frame 106 is coupled to luminaire assembly mounting feature 104-2. In addition, or in the alternative, the frame 106 can be directly coupled to a surface to support the luminaire assembly 199. The frame 106 can have any shape and/or size suitable for the can 103. In certain example embodiments, one or more portions (e.g., sides) of the frame 106 can include one or more complementary coupling features that receive and/or otherwise couple to one or more coupling features of the junction box 102.

FIGS. 2A and 2B show a subassembly 299 of a luminaire that is configured to receive mounting accessories according to certain example embodiments. Specifically, FIG. 2A shows a top perspective view of the subassembly 299, and FIG. 2B shows a detailed perspective view of part of the subassembly 299. Referring to FIGS. 1 through 2B, the subassembly 299 (a type of luminaire assembly that is independent of the luminaire assembly 199 of FIG. 1 or can be disposed in the can 103 of the luminaire assembly 199 of FIG. 1) includes an enclosure top 211, an example adapter 210 in the form of a top plate, and two example adapters 110 (adapter 110-1 and adapter 110-2) in the form of mounting assemblies, part of which is disposed on the top surface of the adapter 210 and part of which is disposed on the enclosure top 211. The adapter 210 has a body 260 that is coupled to the top side of the enclosure top 211. The top-view shape (in this case, circular) and size (e.g., the diameter) of the adapter 210 can be substantially the same as the top-view shape and size of the component (e.g., the enclosure top 211) of the luminaire assembly to which the adapter 210 is coupled. In alternative embodiments, the adapter 210 can have any of a number of other top-view shapes, including but not limited to a square, an oval, a rectangle, and an octagon.

The adapter 210 and the enclosure top 211 can be directly or indirectly coupled to each other in any of a number of ways. For example, in this case, the adapter 210 and the enclosure top 211 are indirectly coupled to each other using a number (in this example, six) of coupling features 266 (e.g., screws, bolts, rivets) that are disposed in coupling features in the form of apertures that traverse the adapter 210 and coincident apertures that traverse at least part of the top of the enclosure top 211. The body 260 of the adapter 210 also can include one or more features to accommodate components of the enclosure top 211. For example, as shown in FIG. 2A, the body 260 of the adapter 210 can include an aperture or cutout that allows an electrical cable 219, which extends from the top side of the enclosure top 211, to extend therethrough.

In certain example embodiments, the top surface 286 of the body 260 of the adapter 210 is substantially planar and includes one or more of a number of features to accommodate mounting accessories. For example, in this case, there are two adapters 110 in the form of receiving assemblies (more specifically, loop and rail assemblies) disposed on the top surface 286 of the body 260 of the adapter 210. Adapter 110-1 and adapter 110-2 are substantially the same as each other in this case. In alternative embodiments, there can be only one or more than two adapters 110. Also, when there are multiple adapters 110, one receiving assembly can be configured differently compared to one or more other adapters 110. Further, multiple adapters 110 can be spaced equidistantly from each other (as in this example), or they can have any other spacing (e.g., randomly) with respect to each other on the adapter 210. Further, an adapter 110 can be located at any place (e.g., along the outer perimeter (as in this example), toward the center) on the top surface 286 of the body 260 of the adapter 210.

In this example, each adapter 110 is in what is sometimes called a loop and rail system. Each adapter 110 in this case includes an end plate 255 and two side rails 251-L and 251-R. Each side rail 251 includes a back wall 253 that extends upward away from the top surface 286 of the body 260 of the adapter 210. Each side rail 251 also includes an upper wall 254 that extends away from and inward with respect to the top end of the back wall 253. In some cases, as in this example, each side rail 251 further includes a lower wall 252 that is substantially planar with the top surface 286 of the body 260 of the adapter 210. In this case, the lower wall 252 extends away from and inward with respect to the bottom end of the back wall 253. As a result, each side rail 251 is C-shaped when viewed from the side, forming a channel therein. When an adapter 110 lacks a lower wall 252, then the resulting side rail 251 is L-shaped when viewed from the side, forming a channel therein and with the top surface 286 of the body 260 of the adapter 210.

The bottom wall 252 of each side rail 251 is coupled (e.g., welded, slot-fitted) to the body 260 of the adapter 210. If there is no bottom wall, then the back wall 253 of each side rail is coupled to the body 260 of the adapter 210. The channel formed by a side rail 251 is open opposite the back wall 253. The pairs of side rails 251 are oriented with respect to each other in such a way that the open side of the channel of one side rail 251 (e.g., side rail 251-L1) and the open side of the channel of the opposing side rail 251 (e.g., side rail 251-R1) face each other.

In this example, adapter 110-1 includes side rail 251-L1 and side rail 251-R1. Side rail 251-L1 includes an upper wall 254-L1, a back wall 253-L1, and a lower wall 252-L1. Side rail 251-R1 includes an upper wall 254-R1, a back wall 253-R1, and a lower wall 252-R1. Also, adapter 110-2 includes side rail 251-L2 and side rail 251-R2. Side rail 251-L2 includes an upper wall 254-L2, a back wall 253-L2, and a lower wall 252-L2. Side rail 251-R2 includes an upper wall 254-R2, a back wall 253-R2, and a lower wall 252-R2.

In certain example embodiments, for a pair of side rails 251, the characteristics (e.g., length, thickness, height) of a component (e.g., back wall 253, upper wall 254) of one side rail 251 can be substantially the same as the corresponding characteristics of the same component of the other side rail 251. In alternative embodiments, one or more of the characteristics of a component of one side rail can be different than the one or more corresponding characteristics of the same component of the other side rail 251. In this case, all four side rails 251 are configured the same as each other.

The distance between side rail 251-L1 and side rail 251-R1 (and more specifically, the distance between the inner surface of the back wall 253-L1 and the inner surface of the back wall 253-R1), as well as the distance between the upper wall 254 and the lower wall 252 of each side rail 251, are designed to receive a base of a mounting assembly, as discussed below. Similarly, the distance between side rail 251-L2 and side rail 251-R2 (and more specifically, the distance between the inner surface of the back wall 253-L2 and the inner surface of the back wall 253-R2), as well as the distance between the upper wall 254 and the lower wall 252 of each side rail 251, are designed to receive a base of a mounting assembly.

Each end plate 255 of an adapter 110 includes a body 256 and an aperture 257 (e.g., a slot, a loop) that traverses therethrough. The body 256 of an end plate 255 of an adapter 110 can be part of or coupled to the side wall of the enclosure top 211. Alternatively, the body 256 of an end plate 255 can be part of or coupled to an outer edge of the adapter 210. The aperture 257 that traverses the body 256 of an end plate 255 is located above and adjacent to the top surface 286 of the body 260 of the adapter 210. For example, the bottom of the aperture 257 can be substantially planar with the top surface 286 of the body 260 of the adapter 210. The body 256 of an end plate 255 can be substantially planar and can be substantially perpendicular to the body 260 of the adapter 210.

The aperture 257 in the body 256 of an end plate 255 can be configured to receive and have disposed therein the base of a mounting assembly, discussed below. The dimensions (e.g., length, width, shape) of the aperture 257 in the body 256 of an end plate 255 can be designed to complement the corresponding cross-sectional dimensions of the base of a mounting assembly. In this example, adapter 110-1 includes end plate 255-1, which has an aperture 257-1 that traverses the body 256-1 of the end plate 255-1. Similarly, adapter 110-2 includes end plate 255-2, which has an aperture that traverses the of the end plate. When there are multiple adapters 110 that include an end plate 255, the configuration of one end plate 255 can be the same as, or different than, the configuration of one or more other end plates 255. In this case, end plate 255-1 and end plate 255-2 are configured substantially the same as each other.

Examples of various mounting accessories are shown in FIGS. 3A through 5B below. FIGS. 3A and 3B show a subassembly 398 that includes mounting accessories 390 using the subassembly 299 of FIGS. 2A and 2B according to certain example embodiments. FIGS. 4A and 4B show another subassembly 498 that includes mounting accessories 490 using the subassembly 299 of FIGS. 2A and 2B according to certain example embodiments. FIGS. 5A and 5B show yet another subassembly 598 that includes mounting accessories 590 using the subassembly 299 of FIGS. 2A and 2B according to certain example embodiments. For the subassembly 398, the subassembly 498, and the subassembly 598, the adapters 110 are disposed on the top surface 286 of the body 260 of the adapter 210.

Specifically, FIG. 3A shows a top perspective view of the subassembly 398 (a type of luminaire assembly), and FIG. 3B shows a perspective view of a mounting accessory 390-1. FIG. 4A shows a top perspective view of the subassembly 498 (a type of luminaire assembly), and FIG. 4B shows a perspective view of a mounting accessory 490-1. FIG. 5A shows a top perspective view of the subassembly 598 (a type of luminaire assembly), and FIG. 5B shows a perspective view of a mounting accessory 590-1.

Referring to FIGS. 1 through 5B, the mounting assemblies 390 of the subassembly 398 (a type of luminaire assembly that is independent of the luminaire assembly 199 of FIG. 1 or can be disposed in the can 103 of the luminaire assembly 199 of FIG. 1) of FIGS. 3A and 3B are designed to couple to the adapters 110 of the subassembly 299.

Specifically, mounting assembly 390-1 is configured to be removably coupled to the adapter 110-1 of the subassembly 299, and mounting accessory 390-2 is configured to be removably coupled to the adapter 110-2 of the subassembly 299. In this case, the configuration of the mounting accessory 390-1 is substantially the same as the configuration of the mounting accessory 390-2. In alternative embodiments, when there are multiple mounting accessories 390, the configuration of one mounting accessory 390 can be different than the configuration of one or more other mounting accessories 390.

Also, in this example, there is one mounting accessory 390 for each adapter 110 of the subassembly 299. In alternative embodiments, there can be a different number (e.g., fewer) of mounting accessories 390 compared to the number of adapters 110. As detailed in FIG. 3B, the mounting accessory 390-1 can include multiple components having any of a number of configurations. In this example, the mounting accessory 390-1 is configured as a spring bracket that includes a base 325-1, a back wall 323-1, a spring 322-1 (sometimes called a mousetrap spring), and a bracket 321-1. The base 325-1 has a tab 326-1 that extends upward at its proximal end therefrom, while the distal end of the tab 326-1 is joined with the base 325-1. This makes the tab 326-1 in the shape of a wedge when the tab 326-1 is in a default position. Mounting accessory 390-1 is configured to be removably coupled to the adapter 110-1.

The tab 326-1 that extends upward from the base 325-1 can temporarily be moved downward to become substantially planar with the base 325-1 when a downward force sufficient to overcome the force keeping the tab 326-1 in its default (upward) position relative to the base 325-1. For example, a user (e.g., an installer) can press downward on the tab 326-1 with a finger to allow the tab 326-1 to become substantially planar with the base 325-1. As another example, the portions of the end plate 255 of an adapter 110 that form the aperture 257 therethrough can force the tab 326-1 downward as the base 325-1 is moved through the aperture 257. Because of the orientation of the wedge configuration of the tab 326-1, the tab 326-1 remains pressed downward until the proximal end of the tab 326-1 clears the aperture, at which point the tab 326-1 is released to its default position.

The base 325-1 and the back wall 323-1 of the mounting accessory 390 can be formed from a single piece or from multiple pieces that are mechanically coupled to each other. The base 325-1 of the mounting accessory 390-1 is configured to be slid through the aperture in the end plate 255-1 and become disposed within the cavities formed by the side rail 251-L1 and the side rail 251-R1 of the adapter 110-1. As provided in the example above, once the base 325-1 slides far enough through the aperture in the end plate 255-1, the tab 326-1 becomes disengaged from the portions of the body of the end plate 255-1 that form the aperture, at which point the tab 326-1 is released to its default position. Once that occurs, the base 325-1 cannot be slid backward because the tab 326-1 abuts against the inner surface of the end plate 255-1 above the aperture.

Further, the back wall 323-1 of the mounting accessory 390-1 limits the forward movement of the base 325-1 within the side rails 251 of the adapter 110-1 when the back wall 323-1 abuts against the outer surface of the end plate 255-1. In certain example embodiments, the distance between the proximal end of the tab 326-1 and the inner surface of the back wall 323-1 is substantially the same as, or slightly larger than, the thickness of the wall of the end plate 255-1. In such a case, once the base 325-1 is moved forward to a particular point within the side rails 251, the base 325-1 remains locked in place relative to the end plate 255-1 until the tab 326-1 is depressed with sufficient force to put all of the tab 326-1 within a horizontal plane formed by the aperture in the end plate 255-1 and, simultaneously, an outward force is applied to the mounting accessory 390-1 to cause the base 325-1 to slide outward back through the aperture in the end plate 255-1.

In this case, the back wall 323-1 is substantially perpendicular to the base 325-1. In alternative embodiments, the back wall 323-1 can form any other angle relative to the base 325-1. When the base 325-1 is secured within the side rails 251, the bracket 321-1 can be used to help secure the subassembly 299 (and so also the rest of the luminaire) against a structure (e.g., a ceiling tile, drywall, a can 103, another component of a luminaire assembly). The coil portion of the spring 322-1 is disposed in an aperture 324-1 (e.g., a slot, a loop) in the back wall 323-1, while the ends of the spring 322-1 are coupled to and/or integrated with the bracket 321-1. In this case, the spring 322-1 applies a constant downward force to the bracket 321-1. If an upward force of sufficient strength to overcome the downward force of the spring 322-1 is applied to the bracket 321-1, then the bracket 321-1 can be rotated upward as long as the upward force is sufficiently applied to the bracket 321-1. Once the upward force is removed, or if the upward force falls below the downward force applied by the spring 322-1, then the bracket 321-1 if forced downward. When the distal end of the bracket 321-1 contacts a structure, the spring 322-1 ensures that the contact is maintained.

As discussed above, the mounting accessory 390-1 is configured substantially the same as the mounting accessory 390-2 of FIG. 3A. For example, part of the mounting accessory 390-2 is disposed within the cavities formed by the side rails 251-L2 and 251-R2 of the adapter 110-2. Also, another part of the mounting accessory 390-2 is disposed within the aperture in the wall of the end plate 255-2 of the adapter 110-2. The mounting accessories 390 of FIGS. 3A and 3B can be used, for example, for a remodeler luminaire (as opposed to a being mounted within a can 103).

Moving on to the subassembly 498 of FIGS. 4A and 4B, the mounting accessories 490 of the subassembly 498 (a type of luminaire assembly that is independent of the luminaire assembly 199 of FIG. 1 or can be disposed in the can 103 of the luminaire assembly 199 of FIG. 1) of FIGS. 4A and 4B are designed to couple to the adapters 110 of the subassembly 299. Specifically, mounting accessory 490-1 is configured to be removably coupled to the adapter 110-1 of the subassembly 299, and mounting accessory 490-2 is configured to be removably coupled to the adapter 110-2 of the subassembly 299. In this case, the configuration of the mounting accessory 490-1 is substantially the same as the configuration of the mounting accessory 490-2. In alternative embodiments, when there are multiple mounting accessories 490, the configuration of one mounting accessory 490 can be different than the configuration of one or more other mounting accessories 490.

Also, in this example, there is one mounting accessory 490 for each adapter 110 of the subassembly 299. In alternative embodiments, there can be a different number (e.g., fewer) of mounting accessories 490 compared to the number of adapters 110. As detailed in FIG. 4B, the mounting accessory 490-1 can include multiple components having any of a number of configurations. In this example, the mounting accessory 490-1 is configured as a blade that includes a base 325-1, a back wall 323-1, and a blade 431-1. The base 325-1 and the back wall 323-1 of the mounting accessory 490-1 in this case are substantially the same as the base 325-1 and the back wall 323-1 of the mounting accessory 390 of FIGS. 3A and 3B.

For example, the base 325-1 has a tab 326-1 that extends upward at its proximal end therefrom, while the distal end of the tab 326-1 is joined with the base 325-1. This makes the tab 326-1 in the shape of a wedge when the tab 326-1 is in a default position. In alternative embodiments, a mounting accessory 490 can have components other than a base 325 and/or a back wall 323, or the base 325 and/or the back wall 323 can have one or more different configurations (e.g., length, height, thickness) compared to the corresponding components of the mounting accessories 390. Mounting accessory 490-1 is configured to be removably coupled to the adapter 110-1.

The blade 431-1 is directly or indirectly coupled to the back wall 323 using one or more coupling features. For example, in this case, the blade 431-1 is indirectly coupled to the back wall 323 using one or more coupling features 433 (e.g., rivets, screws) that each traverse an aperture (a form of coupling feature) in the blade 431-1 and a coincident aperture in the back wall 323. Each end of the blade 431-1 has securing features 432, in this case in the form of serrations. Specifically, the left end of the blade 431-1 has securing features 432-L1, and the right end of the blade 431-1 has securing features 432-R1. These securing features 432 can be used to dig into or otherwise create a friction contact with the inner surface of a can 103. In this way, the mounting accessories 490 can be used, for example, with a fixed-mount (canned) luminaire. The blade 431-1 can be planar or have some curvature, as needed, to result in a more effective mounting.

As discussed above, the mounting accessory 490-1 is configured substantially the same as the mounting accessory 490-2 of FIG. 4A. For example, part of the mounting accessory 490-2 is disposed within the cavities formed by the side rails 251-L2 and 251-R2 of the adapter 110-2. Also, another part of the mounting accessory 490-2 is disposed within the aperture in the wall of the end plate 255-2 of the adapter 110-2.

In addition, the subassembly 498 of FIG. 4A shows that the body 260 of the adapter 210 has been modified (e.g., includes one or more coupling features, such as apertures) to allow for a junction box securing component 437 to be directly or indirectly coupled to the top surface 286 of the body 260 of the adapter 210. The junction box securing component 437 can have any of a number of configurations. For example, in this case, the junction box securing component 437 is a clip formed from a strip of metal. The junction box securing component 437 is able to apply a compressive force to the junction box 402 (substantially similar to the junction box 102 discussed above with respect to FIG. 1) when the junction box 402 is engaged by the junction box securing component 437. Further, the junction box securing component 437 is orientated and positioned in such a way that the junction box securing component 437/junction box 402 combination and the mounting accessories 490 do not interfere with each other.

Moving on to the subassembly 598 (a type of luminaire assembly that is independent of the luminaire assembly 199 of FIG. 1 or can be disposed in the can 103 of the luminaire assembly 199 of FIG. 1) of FIGS. 5A and 5B, the mounting accessories 590 of the subassembly 598 of FIGS. 5A and 5B are designed to couple to the adapters 110 of the subassembly 299. Specifically, mounting accessory 590-1 is configured to be removably coupled to the adapter 110-1 of the subassembly 299, and mounting accessory 590-2 is configured to be removably coupled to the adapter 110-2 of the subassembly 299. In this case, the configuration of the mounting accessory 590-1 is substantially the same as the configuration of the mounting accessory 590-2. In alternative embodiments, when there are multiple mounting accessories 590, the configuration of one mounting accessory 590 can be different than the configuration of one or more other mounting accessories 590.

Also, in this example, there is one mounting accessory 590 for each adapter 110 of the subassembly 299. In alternative embodiments, there can be a different number (e.g., fewer) of mounting accessories 590 compared to the number of adapters 110. As detailed in FIG. 5B, the mounting accessory 590-1 can include multiple components having any of a number of configurations. In this example, the mounting accessory 590-1 is configured as a torsion spring assembly that includes a base 325-1, a back wall 323-1, and a torsion spring 541-1. The base 325-1 and the back wall 323-1 of the mounting accessory 590 in this case are substantially the same as the base 325-1 and the back wall 323-1 of the mounting accessory 390-1 of FIGS. 3A and 3B.

For example, the base 325-1 has a tab 326-1 that extends upward at its proximal end therefrom, while the distal end of the tab 326-1 is joined with the base 325-1. This makes the tab 326-1 in the shape of a wedge when the tab 326-1 is in a default position. In alternative embodiments, a mounting accessory 590 can have components other than a base 325 and/or a back wall 323, or the base 325 and/or the back wall 323 can have one or more different configurations (e.g., length, height, thickness) compared to the corresponding components of the mounting accessories 590. Mounting accessory 590-1 is formed when the mounting accessory 590-1 is engaged with the adapter 110-1.

The torsion spring 541-1 is directly or indirectly coupled to the back wall 323 using one or more coupling features. For example, in this case, the torsion spring 541-1 is indirectly coupled to the back wall 323 using one or more coupling features (e.g., rivets, screws) that each traverse an aperture (a form of coupling feature) in the back wall 323 and an aperture in a clamp, which secures part of the torsion spring 541-1. Each end of the torsion spring 541-1 can have has securing features (e.g., a hooked configuration). These ends of the torsion spring 541-1 can be used to dig into or otherwise create a friction contact with the inner surface of a can 103. In this way, the mounting accessories 590 can be used, for example, with a fixed-mount (canned) luminaire.

As discussed above, the mounting accessory 590-1 is configured substantially the same as the mounting accessory 590-2 of FIG. 5A. For example, part of the mounting accessory 590-2 is disposed within the cavities formed by the side rails 251-L2 and 251-R2 of the adapter 110-2. Also, another part of the mounting accessory 590-2 is disposed within the aperture in the wall of the end plate 255-2 of the adapter 110-2.

As can be seen, the mounting accessories 390 of FIG. 3A, the mounting accessories 490 of FIG. 4A, and mounting accessories 590 of FIG. 5A can be installed, removed, and interchanged without the use of tools. Also, the mounting assembly (or portions thereof) and/or other parts of a mounting accessory can have any of a number of other configurations aside from what is shown herein and still be effective at securing the subassembly 299 (or other part of a luminaire) against a structure (e.g., another part (e.g., the can 103) of a luminaire assembly).

Figure 6A:
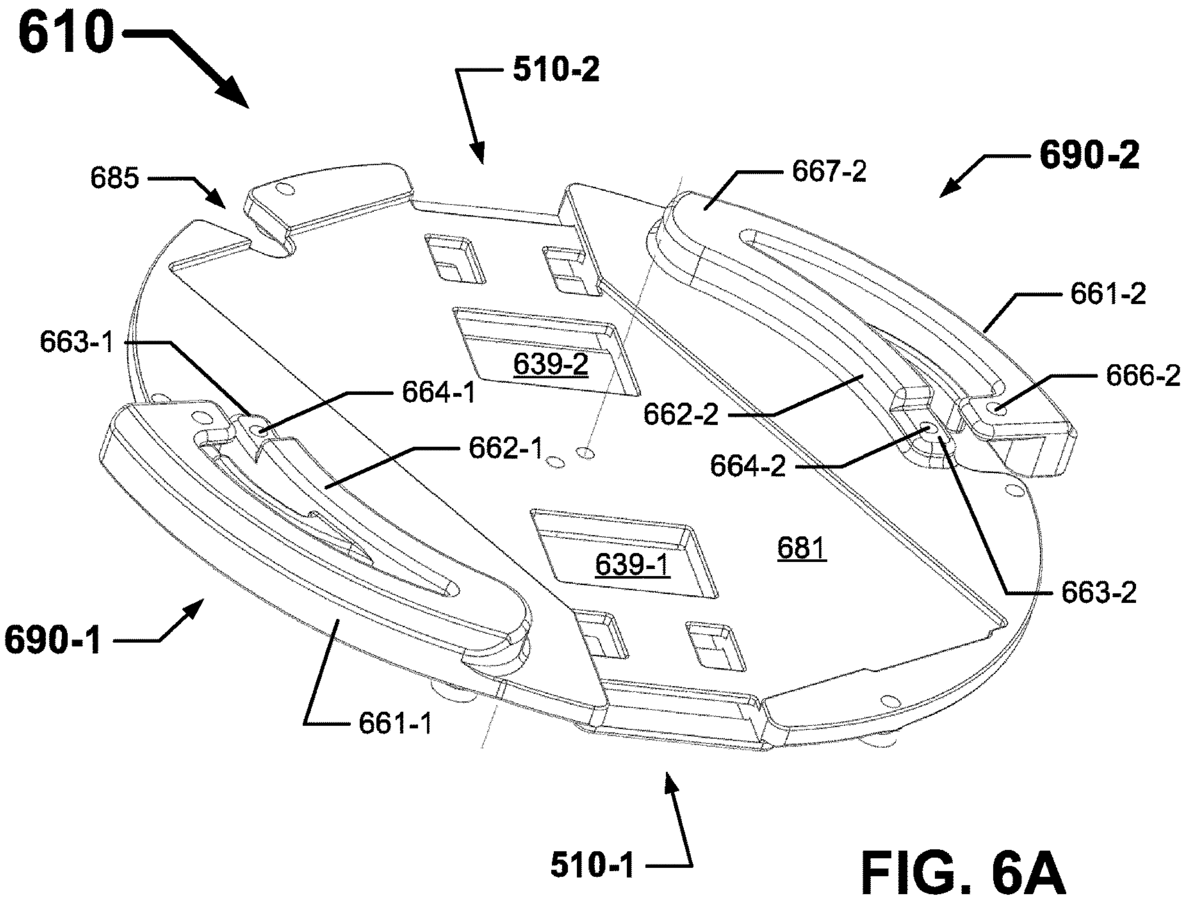
Figure 6B:
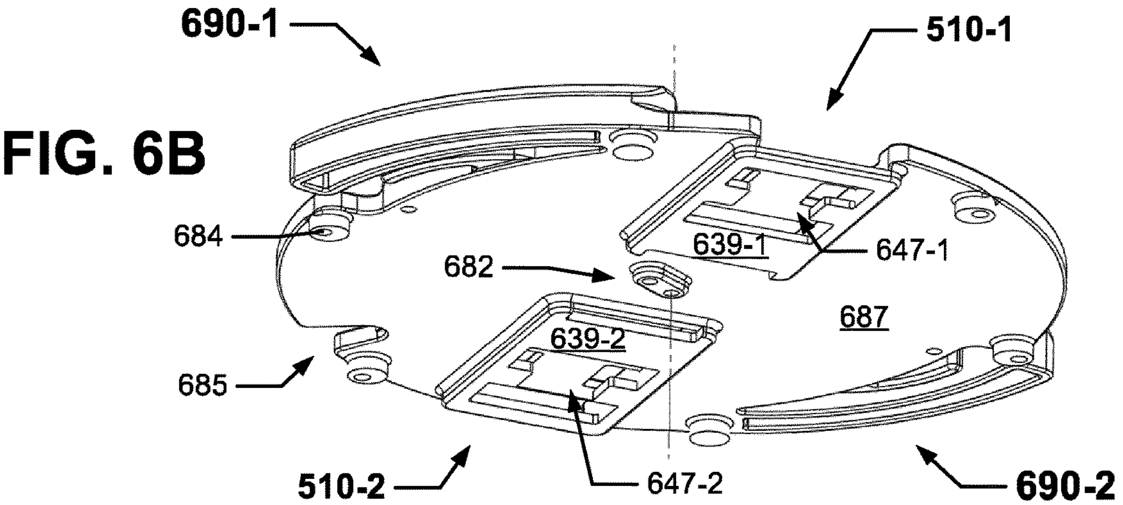
Figure 6C:
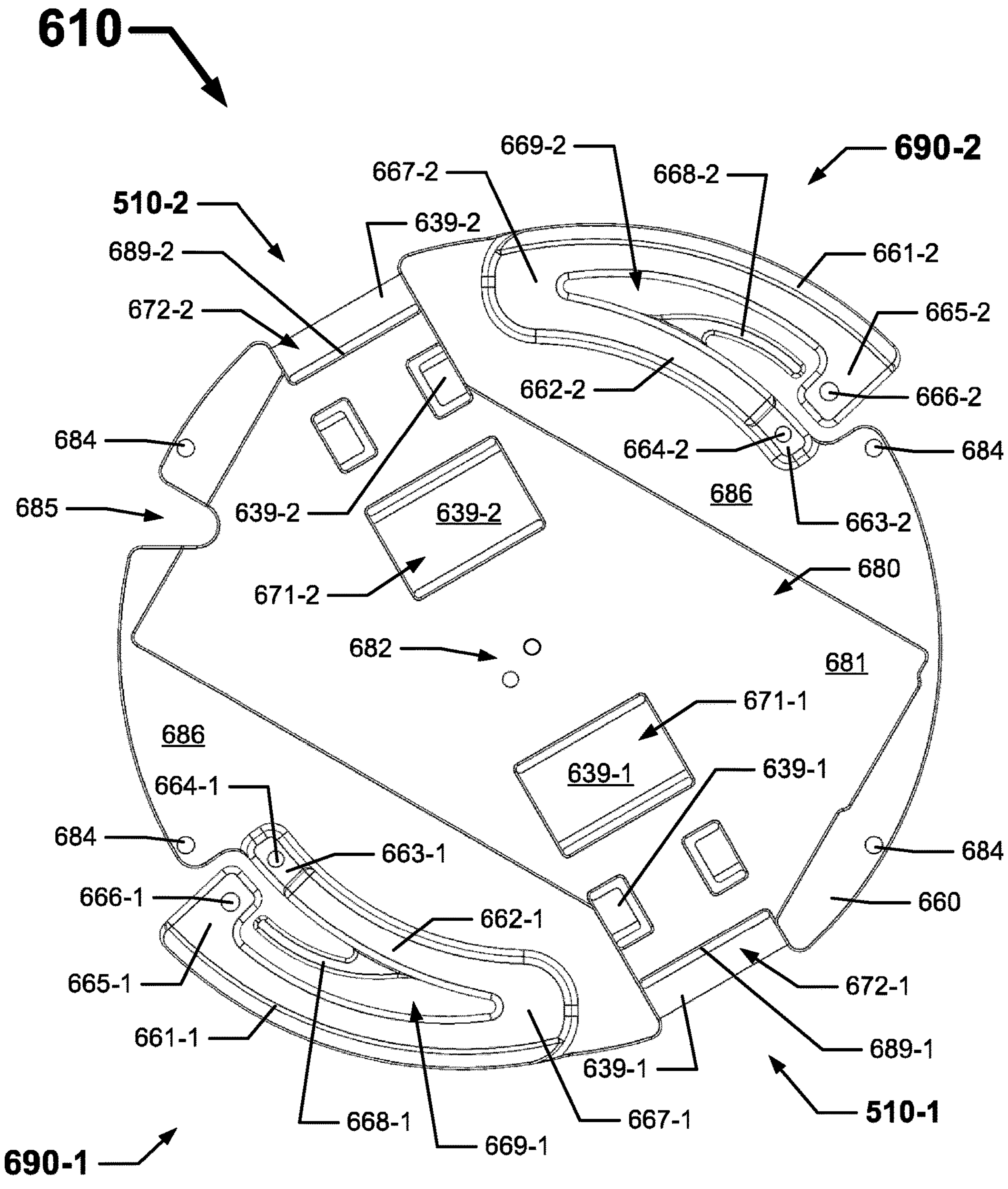
Figure 6D:
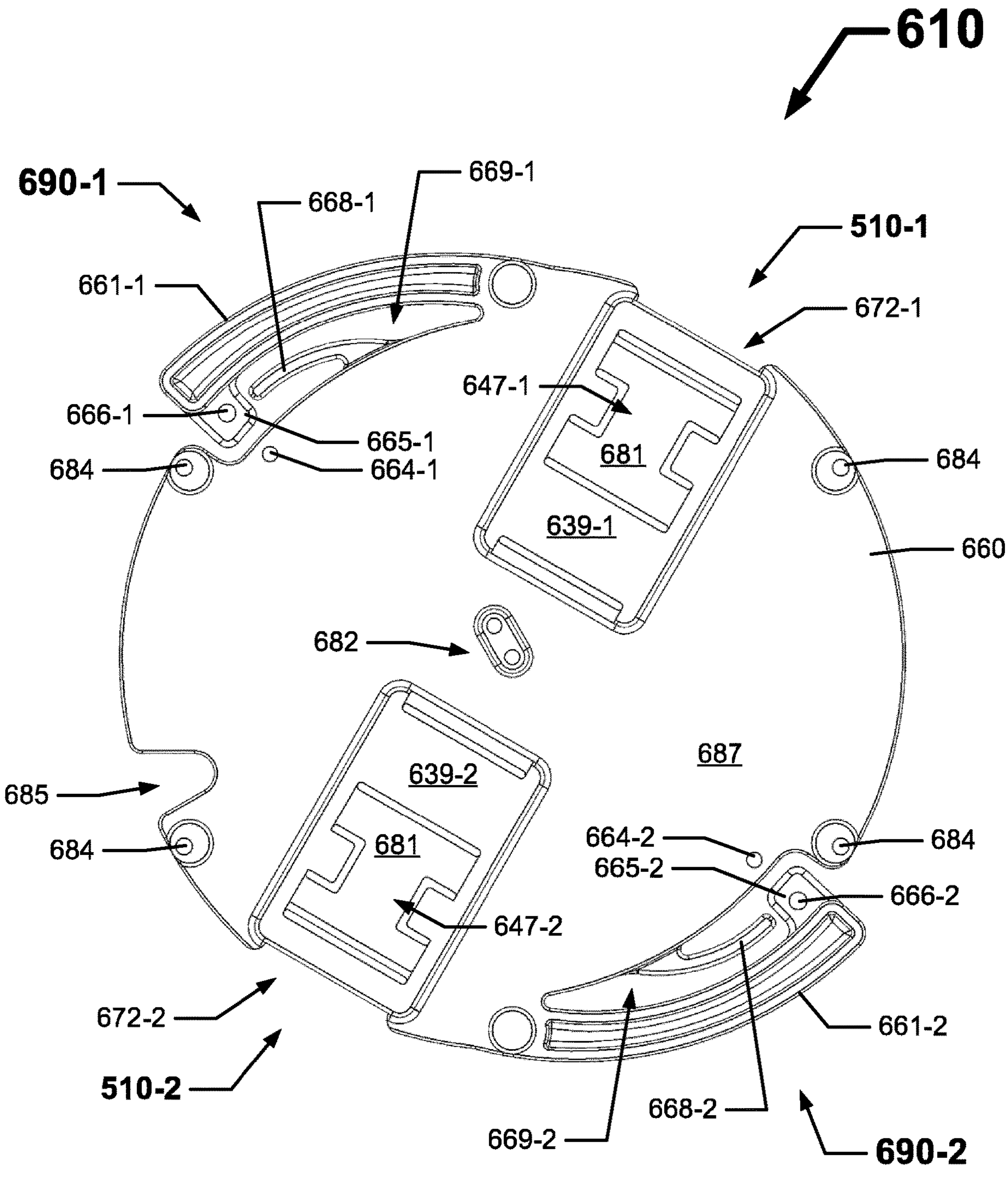

In certain example embodiments, one or more mounting accessories can be disposed on an additional component of a luminaire rather than retrofitted onto an existing component of the luminaire. FIGS. 6A through 6D show various views of an adapter 610 that includes mounting accessories according to certain example embodiments. Specifically, FIG. 6A shows a top perspective view of the adapter 610. FIG. 6B shows a bottom perspective view of the adapter 610. FIG. 6C shows a top view of the adapter 610. FIG. 6D shows a bottom view of the adapter 610. Referring to FIGS. 1 through 6D, the adapter 610 is a separate component that is configured to be coupled to an existing component (e.g., an enclosure top) of a luminaire. The adapter 610 can be used for direct-mount luminaire configurations or for remodeler luminaire configurations.

The adapter 610 can include one or more mounting accessories 690. For example, in this case, the adapter 610 includes two mounting accessories 690 (mounting accessory 690-1 and mounting accessory 690-2). In some cases, the adapter 610 can additionally or alternatively include one or more additional adapters 510 (in this case, adapter 510-1 and adapter 510-2). The additional adapters 510 disposed in the adapter 610 can serve the same function (e.g., act as part of a mounting accessory when combined with a removable mounting component) as the adapters 110 discussed above, but are configured differently than the adapters 110, as discussed below.

The adapter 610 includes one or more coupling features 684 that allow the adapter 610 to be directly or indirectly coupled to another component (e.g., the enclosure top 211) of a luminaire. In this case, the coupling features 684 are in the form of apertures that traverse the body 660 of the adapter 610 toward the outer perimeter of the body 660. The configuration (e.g., spacing, number, size) of the coupling features 684 can be designed to complement corresponding coupling features of the other component of the luminaire to which the adapter 610 couples.

The two mounting accessories 690 of the adapter 610 in this case are configured substantially the same as each other and are positioned equidistantly with respect to each other along the outer perimeter of the body 660 of the adapter 610. Each mounting accessory 690 includes a primary radial spring arm 661 and an optional secondary radial spring arm 668. The primary radial spring arm 661 is movably coupled to a base 662 of the mounting accessory 690 at a hinge 667. The hinge 667 can be a mechanical hinge or, as in this case, a seamless joint where the base 662 and the primary radial spring arm 661 meet. In some cases, the base 662 can be integrated with the body 660 of the adapter 610. Alternatively, the base 662 can be a separate piece that is mechanically coupled to the body 660 of the adapter 610.

The primary radial spring arm 661 in this case has an inward extension 665 disposed at its distal end. The inward extension 665 includes at least one coupling feature 666. In this example, the coupling feature 666 is an aperture that traverses the thickness of the inward extension 665. The coupling feature 666 is configured to complement a coupling feature 664 disposed on a support ledge 663 at the distal end of the base 662. When an inward force of sufficient strength is applied to the primary radial spring arm 661, the coupling feature 666 and the coupling feature 664 can engage with each other so that the coupling feature 666 and the coupling feature 664 can be directly or indirectly coupled to each other. When this occurs, the outer surface of the primary radial spring arm 661 forms a continuous arc with the outer perimeter of the body 660 of the adapter 610.

In other words, when viewed from above when the coupling feature 666 and the coupling feature 664 of both mounting accessories 690 are engaged with each other, putting the mounting accessories 690 in a locked position, the outer perimeter of the body 660 of the adapter 610 is substantially circular. By contrast, when the primary radial spring arm 661 is in its default (unlocked) position, as shown in FIGS. 6A through 6D, the extend well outside the circular outer perimeter of the body 660 of the adapter 610. In this way, when the adapter 610 is part of an assembly that is disposed inside a can (e.g., can 103), the primary radial spring arm 661 of each mounting accessory 690, in its default position, engages the inner surface of the can, thereby securing the adapter 610 (as well as other components of a luminaire coupled to the adapter 610) relative to the can 103. The top-view shape (in this case, circular) and size (e.g., the diameter) of the adapter 610 can be substantially the same as the top-view shape and size of the component (e.g., the enclosure top) of the luminaire assembly to which the adapter 610 is coupled.

In this example, when an independent coupling feature (e.g., a screw) is simultaneously disposed in the coupling feature 666 and the coupling feature 664, the primary radial spring arm 661 is held closed (in its non-default position). In an alternative embodiment, coupling feature 666 can be in the form of an aperture, and the coupling feature 664 can be in the form of a spring boss. In such a case, the coupling feature 666 can directly couple to the coupling feature 664 by slipping the coupling feature over the coupling feature 664. In addition, in this example, the coupling feature 666 and the coupling feature 664 can be coupled to each other and decoupled from each other without the use of tools.

The secondary radial spring arm 668, when present, extends from the base 662 and is located in a space 669 formed between the base 662 and the primary radial spring arm 661. The secondary radial spring arm 668 helps reduce material fatigue on the base 662 and the primary radial spring arm 661. In some cases, the secondary radial spring arm 668 can also provide some lift (vertical movement) when the mounting accessories engage a structure (e.g., another component (e.g., the can 103) of a luminaire assembly). For example, when the primary radial spring arm 661 (and so also the secondary radial spring arm 668) of a mounting accessory 690 is compressed, the primary radial spring arm 661 is supported vertically by the support ledge 663, which eliminates downward deformation of the primary radial spring arm 661 (and so also the secondary radial spring arm 668). During installation of a luminaire system, this can help eliminate trim-to-ceiling gaps from the primary radial spring arm 661 and the secondary radial spring arm 668 rebounding the luminaire downward. In some cases, the support ledge 663 is substantially parallel with the upper surface of the body 660 of the adapter 610.

In some alternative embodiments, the support ledge 663 can be angled (e.g., slightly antiparallel with the upper surface of the body 660 of the adapter 610). For example, when the support ledge 663 is angled slightly downward toward the primary radial spring arm 661, and when the bottom surface of the inward extension 665 is similarly angled so that the support ledge 663 and the inward extension 665 are parallel with each other when those surfaces abut against each other, the angled surfaces of the support ledge 663 and the inward extension 665 can preload the primary radial spring arm 661 and the secondary radial spring arm 668 in an upward position. Once the primary radial spring arm 661 and the secondary radial spring arm 668 are released to their default positions, the primary radial spring arm 661 and the secondary radial spring arm 668 push downward and outward, drawing the luminaire upward into the ceiling, can 103, or other structure.

As discussed above, the mounting accessory 690-1 and the mounting accessory 690-2 are configured substantially similar to each other. In this case, the mounting accessory 690-1 includes a base 662-1, a hinge 667-1, a primary radial spring arm 661-1, a secondary radial spring arm 668-1 disposed in a space 669-1 between the primary radial spring arm 661-1 and the base 662-1, an inward extension 665-1 with a coupling feature 666-1 at the distal end of the primary radial spring arm 661-1, and a support ledge 663-1 with a coupling feature 664-1 at the distal end of the base 662-1. Similarly, the mounting accessory 690-2 includes a base 662-2, a hinge 667-2, a primary radial spring arm 661-2, a secondary radial spring arm 668-2 disposed in a space 669-2 between the primary radial spring arm 661-2 and the base 662-2, an inward extension 665-2 with a coupling feature 666-2 at the distal end of the primary radial spring arm 661-2, and a support ledge 663-2 with a coupling feature 664-2 at the distal end of the base 662-2.

The body 660 of the adapter 610 in this case has a recessed area 680 in its top surface 686. The recessed area 680 has a substantially planar top surface 681 that is substantially parallel to the planar top surface 686 of the rest of the body 660. The recessed area 680 in this case is substantially rectangular when viewed from above, as shown in FIG. 6C. In alternative embodiments, the recessed area 680 can have any of a number of other shapes when viewed from above. While there is a single recessed area 680 in this example, there can be multiple recessed areas 680 in the top of the body 660. The recessed area 680 and its various configurations (e.g., size, shape, depth, quantity) can be configured to receive a component (e.g., a junction box) of the luminaire assembly, as shown by example in FIG. 10 below. In some cases, the recessed area 680 is an optional feature of the adapter 610.

As discussed above, in certain example embodiments, the adapter 610 can include one or more additional 510, where each additional adapter 510 can serve the same function as the adapters 110 discussed above but are configured differently than the adapters 110. In this case, each additional adapter 510 is formed by a combination of (1) a space 672 (space 672-1 for adapter 510-1 and space 672-2 for adapter 510-2) between the bottom surface 687 of the body 660 below the recessed area 680 and protrusions 639 in the bottom surface 687 of the body 660 of the adapter 610, and (2) openings 671 in the recessed area 680 of the body 660 and in the protrusions 639.

The adapter 610 can have one or more protrusions 639 that extend from the bottom surface 687 of the body 660. In this case, there are two protrusions 639 (protrusion 639-1 and protrusion 639-2), as shown in FIGS. 6B and 6D. In this example, there are also other protrusions that coincide with the coupling features 682 and with the coupling features 684, all in the form of apertures, that traverse the thickness of the body 660. The height of these protrusions (e.g., protrusion 639-1, protrusion 639-2) can be configured to complement a feature (e.g., a recess) of another component (e.g., the enclosure top 211) of the luminaire assembly. A protrusion can be stamped, extruded, molded, or otherwise integrated with the bottom surface 687 of the body 660. Alternatively, a protrusion can be a separate piece that is coupled to the bottom surface 687 of the body 660.

The protrusions 639 are rectangular in shape and have an I-shaped opening 647 (opening 647-1 in protrusion 639-1 and opening 647-2 in protrusion 639-2). In alternative embodiments, the shape of an opening 647 and/or a protrusion 639 can vary. In yet other alternative embodiments, there can be no openings in a protrusion 639. While protrusion 639-1 and protrusion 639-2 are configured substantially the same as each other in this example, in alternative embodiments, when the adapter 610 includes multiple protrusions 639, the configuration of one protrusion 639 can be different than the configuration of one or more of the other protrusions 639. In this case, the tabs in each of the protrusions 639 formed within the I-shaped openings 647 can be used to support a portion (e.g., the base 325-1) of a mounting accessory (e.g., mounting accessory 490-1).

As discussed above, there can be one or more openings 671 in the body 660 at the recessed area 680 to help define additional adapters 510. In this case, there are multiple openings for each additional adapter 510. For example, opening 671-1 in the body 660 at the recessed area 680 is rectangular-shaped, and its proximal side serves functionally as a stop for adapter 510-1. Similarly, opening 671-2 in the body 660 at the recessed area 680 is rectangular-shaped, and its proximal side serves functionally as a stop for adapter 510-2. The characteristics (e.g., shape, size, location) of the openings 671 in this case are substantially similar to each other and in terms of their respective adapters 510. In alternative embodiments, when there are multiple additional adapters 510 each having an opening, one or more characteristics of an opening 671 for one adapter 510 can differ from a corresponding characteristic of an opening 671 for one or more other adapters 510. There are also two other openings for each adapter 510 to reveal the tabs formed by the opening 647 in the protrusion 639 associated with that adapter 510. In this case, these openings provide no functionality for the adapters 510.

Relatedly, for each adapter 510, the outer perimeter of the top surface 681 of the recessed area 680 is manipulated. Specifically, the outer perimeter 689-1 of the top surface 681 of the recessed area 680 at the adapter 510-1 forms a chamfer relative to the rest of the outer perimeter of the recessed area 680. The chamfer formed by the outer perimeter 689-1 is parallel to the longitudinal sides of the opening 671-1. Similarly, the outer perimeter 689-2 of the top surface 681 of the recessed area 680 at the adapter 510-2 forms a chamfer relative to the rest of the outer perimeter of the recessed area 680. The chamfer formed by the outer perimeter 689-2 is parallel to the longitudinal sides of the opening 671-2. In certain example embodiments, the outer perimeters 689 can serve as a stop for their respective adapters 510.

The body 660 of the adapter 610 can also include other features. For example, the body 660 can include an electrical cable accommodation feature 685 disposed at some location (e.g., along the outer perimeter of the body 660) to allow an electrical cable (e.g., electrical cable 219) of a luminaire assembly to pass therethrough. The electrical cable accommodation feature 685 can have any shape, size, and/or other characteristics necessary for fulfilling its function. As another example, there can be one or more coupling features 682 (in this case, in the form of apertures) that traverse the body 660 (in this case, through the recessed area 680 in the approximate center of the body 660) for coupling, directly or indirectly, to another component (e.g., junction box 402, the junction box securing component 437) of a luminaire assembly.

FIGS. 7A and 7B show various views of another adapter 710 that includes mounting accessories 790 according to certain example embodiments. Specifically, FIG. 7A shows a top view of the adapter 710, and FIG. 7B shows a bottom view of the adapter 710. Referring to FIGS. 1 through 7B, the adapter 710 of FIGS. 7A and 7B is substantially similar to the adapter 610 of FIGS. 6A through 6D, except as described below. For example, the adapter 710 has two equidistantly spaced mounting accessories 790 (mounting accessory 790-1 and mounting accessory 790-2) along the outer perimeter of the body 760 of the adapter 710. The mounting accessories 790 of FIGS. 7A and 7B are substantially similar to the mounting accessories 690 of FIGS. 6A through 6D.

For example, the body 760 of the adapter 710 in this case has a recessed area 780 in its top surface 786. The recessed area 780 has a substantially planar top surface 781 that is substantially parallel to the planar top surface 786 of the rest of the body 760. The outer perimeter of the recessed area 780 in this case is substantially rectangular when viewed from above, as shown in FIG. 7A. However, both the recessed area 780 and the rest of the body 760 have a number of openings 738 (in this case, opening 738-1, opening 738-2, opening 738-3, and opening 738-4) that traverse the body 760 and/or removed portions 736 (in this case, removed portion 736-1 and removed portion 736-2) from the body 760. The openings 738 and the removed portions 736 are designed to save on material and related costs for the adapter 710 without compromising the structural integrity of the adapter 710.

In addition, the mounting accessory 790-1 includes a base 762-1, a hinge 767-1, a primary radial spring arm 761-1, a secondary radial spring arm 768-1 disposed in a space 769-1 between the primary radial spring arm 761-1 and the base 762-1, an inward extension 765-1 with a coupling feature 766-1 at the distal end of the primary radial spring arm 761-1, and a support ledge 763-1 with a coupling feature 764-1 at the distal end of the base 762-1. Similarly, the mounting accessory 790-2 includes a base 762-2, a hinge 767-2, a primary radial spring arm 761-2, a secondary radial spring arm 768-2 disposed in a space 769-2 between the primary radial spring arm 761-2 and the base 762-2, an inward extension 765-2 with a coupling feature 766-2 at the distal end of the primary radial spring arm 761-2, and a support ledge 763-2 with a coupling feature 764-2 at the distal end of the base 762-2.

Also, the adapter 710 of FIGS. 7A and 7B includes two equidistantly spaced additional adapters 910 (additional adapter 910-1 and additional adapter 910-2) along the outer perimeter of the body 760 of the adapter 710. The additional adapters 7150 of FIGS. 7A and 7B are substantially similar to the additional 510 of FIGS. 6A through 6D. For example, each additional adapter 910 can serve the same function as the adapters 110 discussed above but are configured differently than the adapters 110. In this case, each additional adapter 910 is formed by a combination of (1) a space 772 (space 772-1 for additional adapter 910-1 and space 772-2 for additional adapter 910-2) between the bottom surface 787 of the body 760 below the recessed area 780 and protrusions 739 in the bottom surface 787 of the body 760 of the adapter 710, and (2) openings 771 in the recessed area 780 of the body 760 and in the protrusions 739.

In this case, the adapter 710 has two protrusions 739 (protrusion 739-1 and protrusion 739-2). There are also other protrusions that extend from the bottom surface 787 of the body 760 and that coincide with the coupling features 782 and with the coupling features 784, all in the form of apertures, that traverse the thickness of the body 760. The height of these protrusions (e.g., protrusion 739-1, protrusion 739-2) can be configured to complement a feature (e.g., a recess) of another component (e.g., the enclosure top 211) of the luminaire assembly.

The protrusions 739 are rectangular in shape and have an I-shaped opening 747 (opening 747-1 in protrusion 739-1 and opening 747-2 in protrusion 739-2). In this case, the tabs in each of the protrusions 739 formed within the I-shaped openings 747 can be used to support a portion (e.g., the base 325-1) of a mounting accessory (e.g., mounting accessory 490-1). In this case, there are two other openings in each of the protrusions 739.

There are multiple other openings in the body 760 that are associated with each additional adapter 910. For example, opening 771-1 in the body 760 at the recessed area 780 is rectangular-shaped, and its proximal side serves functionally as a stop for additional adapter 910-1. Similarly, opening 771-2 in the body 760 at the recessed area 780 is rectangular-shaped, and its proximal side serves functionally as a stop for additional adapter 910-2. The characteristics (e.g., shape, size, location) of the openings 671 in this case are substantially similar to each other and in terms of their respective additional adapters 910. There are also two other openings for each additional adapter 910 to reveal the tabs formed by the opening 747 in the protrusion 739 associated with that additional adapter 910.

Relatedly, for each additional adapter 910, the outer perimeter 789-1 of the top surface 781 of the recessed area 780 at the additional adapter 910-1 forms a chamfer relative to the rest of the outer perimeter of the recessed area 780. The chamfer formed by the outer perimeter 789-1 is parallel to the longitudinal sides of the opening 771-1. Similarly, the outer perimeter 789-2 of the top surface 781 of the recessed area 780 at the additional adapter 910-2 forms a chamfer relative to the rest of the outer perimeter of the recessed area 780. The chamfer formed by the outer perimeter 789-2 is parallel to the longitudinal sides of the opening 771-2. The outer perimeters 789 can serve as a stop for their respective additional adapter 910-1, as explained below.

The body 760 of the adapter 710 can also include other features. For example, there can be one or more coupling features 782 (in this case, in the form of apertures) that traverse the body 760 (in this case, through the recessed area 780 in the approximate center of the body 760) for coupling, directly or indirectly, to another component (e.g., junction box 402, the junction box securing component 437) of a luminaire assembly. Because of the shape of the body 760, there is no need for a feature such as the electrical cable accommodation feature 685 in the adapter 610 of FIGS. 6A through 6D. Also, the adapter 710 includes one or more coupling features 784, similar to the coupling features 784 in the adapter 610 of FIGS. 6A through 6D.

The reduced material in the body 760 of the adapter 710 of FIGS. 7A and 7B compared to the body 660 of the adapter 610 of FIGS. 6A through 6D can provide one or more other advantages and/or features that may be unattainable or more difficult to attain in the adapter 610. For example, when an enclosure top (e.g., enclosure top 211) can have different sizes (e.g., 4 inches, six inches), the body 760 of the adapter 710 can include one or more features (e.g., slots, springs, hinges) that allow the adapter 710 to expand and/or retract to achieve an appropriate size for the enclosure top or other part of a luminaire assembly to which the adapter 710 couples.

FIGS. 8A and 8B show various views of a subassembly 897 that includes an adapter 810 according to certain example embodiments. Specifically, FIG. 8A shows an exploded view of the subassembly 897, and FIG. 8B shows a perspective view of the subassembly 897. Referring to FIGS. 1 through 8B, the subassembly 897 (a type of luminaire assembly that is independent of the luminaire assembly 199 of FIG. 1 or can be disposed in the can 103 of the luminaire assembly 199 of FIG. 1) includes the adapter 810, an enclosure top 811, and multiple (in this case, four) coupling features 885. The enclosure top 811 of FIGS. 8A and 8B is substantially similar to the enclosure top 211 discussed above. The coupling features 885 in this case are screws that are used to couple the adapter 810 and the enclosure top 811 to each other through the coupling features 884 (in this case, apertures similar to the coupling features 684 of the adapter 610 of FIGS. 6A through 6D) in the adapter 810 and corresponding coupling features 816 (in this case, apertures) in the enclosure top 811.

The adapter 810 in this case is substantially similar to the adapter 610 of FIGS. 6A through 6B, except that the adapter 810 of FIGS. 8A and 8B does not include any additional adapters, such as the additional adapters 510 of the adapter 610. The adapter 810 of FIGS. 8A and 8B does include two opposing mounting accessories 890 (mounting accessory 890-1 and mounting accessory 890-2), a recessed area 880 in the top surface of the body 860 of the adapter 810, and multiple coupling features 882 disposed in the approximate center of the body 860. These components of the adapter 810 are substantially similar to the mounting accessories 690, recessed area 680 in the top surface 686 of the body 660, and the coupling features 682 of the adapter 610 of FIGS. 6A through 6B. With the configuration of the adapter 810, the subassembly 897 of FIGS. 8A and 8B can be used in a direct-mount installation (e.g., inside a can 103) for luminaire assembly.

FIG. 9 shows another subassembly 996 that includes the subassembly 897 of FIGS. 8A and 8B. Referring to FIGS. 1 through 9, the subassembly 996 (a type of luminaire assembly that is independent of the luminaire assembly 199 of FIG. 1 or can be disposed in the can 103 of the luminaire assembly 199 of FIG. 1) of FIG. 9 includes the subassembly 897 and a mounting accessory 990. The mounting accessory 990 can be used in remodeler mounting, making the mounting accessories 890 unnecessary. In such a case, a coupling feature 938-1 (in this case, in the form of a screw) can be used to engage the coupling features 666-1 and 664-1 (as discussed above with respect to FIGS. 6A through 6D) to keep the mounting accessory 890-1 in a locked position (also called a non-default position or a closed position). Similarly, a coupling feature 938-2 (in this case, in the form of a screw) can be used to engage the coupling features 666-2 and 664-2 (as discussed above with respect to FIGS. 6A through 6D) to keep the mounting accessory 890-2 in a locked position. When this occurs, the outer perimeter of the mounting accessories 890 is coincident with the outer perimeter of the body 860 of the adapter 810.

The mounting accessory 990 of FIG. 9 includes a U-shaped component having a base 929, where one end of the base 929 couples to a bracket 921-1, and where the other end of the base 929 couples to a bracket 921-2. The base 929 is disposed in and coupled, directly or indirectly, to the recessed area 880 of the adapter 810. In this case, a coupling feature 937 (in this case, in the form of a screw) traverses an aperture in the base 929 and one of the coupling features 882 in the recessed area 880 in the body 860 of the adapter 810. The length of the base 929 can be substantially the same as the diameter of the enclosure top 811 of the subassembly 897.

One end of the base 929 includes a side wall 928-1 having an aperture 927-1 (e.g., a slot, a loop) that traverses therethrough. The other end of the base 929 includes a side wall 928-2 having an aperture 927-2 (e.g., a slot, a loop) that traverses therethrough. The side wall 928-1 and the side wall 928-2 are each substantially perpendicular to the base 929. In alternative embodiments, the side wall 928-1 and the side wall 928-2 can form some other angle (e.g., an acute angle, an obtuse angle) with the base 929. The base 929 and one or both of the side walls 928 can be formed from a single piece. Alternatively, they can be separate pieces that are directly or indirectly mechanically coupled to each other.

A spring 922-1 is disposed in the aperture 927-1 and engaged with the side wall 928-1, and a spring 922-2 is disposed in the aperture 927-2 and engaged with and the side wall 928-2. The side walls 928 and the apertures 927 in the side walls 928 can be substantially similar to the end wall 323-1 and the aperture 324-1 in the end wall 323-1 discussed above with respect to FIGS. 3A and 3B. The distal ends of the spring 922-1 are coupled to a bracket 921-1, and the distal ends of the spring 922-2 are coupled to a bracket 921-2. The brackets 921 and the springs 922 of the mounting accessory 990 are substantially similar to the bracket 321-1 and the spring 322-1 discussed above with respect to FIGS. 3A and 3B.

For example, the coil portion of the spring 922-1 is disposed in the aperture 927-1 (e.g., a slot, a loop) in the side wall 928-1, while the ends of the spring 922-1 are coupled to and/or integrated with the bracket 921-1. Similarly, the coil portion of the spring 922-2 is disposed in the aperture 927-2 (e.g., a slot, a loop) in the side wall 928-2, while the ends of the spring 922-2 are coupled to and/or integrated with the bracket 921-2. In this case, each spring 922 applies a constant downward force to the associated bracket 921. If an upward force of sufficient strength to overcome the downward force of a spring 922 is applied to the associated bracket 921, then the bracket 921 can be rotated upward as long as the upward force is sufficiently applied to the bracket 921. Once the upward force is removed, or if the upward force falls below the downward force applied by a spring 922, then the associated bracket 921 if forced downward. When the distal end of a bracket 921 contacts a structure, the spring 922 ensures that the contact is maintained.

FIG. 10 shows yet another subassembly 1094 that includes the subassembly 897 of FIGS. 8A and 8B. Referring to FIGS. 1 through 10, the subassembly 1094 (a type of luminaire assembly that is independent of the luminaire assembly 199 of FIG. 1 or can be disposed in the can 103 of the luminaire assembly 199 of FIG. 1) of FIG. 10 includes the subassembly 897 (including mounting accessory 890-1 and mounting accessory 890-2 in an unlocked position (default) position) and a junction box 1002 mounted directly on the adapter 810. Specifically, the junction box 1002 is placed within the recessed area 880 of the adapter 810. The junction box 1002 can be directly or indirectly coupled to the adapter 810 in any of a number of ways. For example, the bottom wall of the junction box 1002 can have one or more coupling features in the form of apertures that traverse therethrough, and one or more independent coupling features (e.g., screws) can be used to engage the coupling features in the bottom wall of the junction box 1002 and coupling features 882 of the adapter 810. The profile of the junction box 1002 can match the outer perimeter of the recessed area 880 or have one or more dimensions (e.g., length, width) that are less than a corresponding dimension of the recessed area 880.

FIGS. 11A and 11B show various views of still another subassembly 1193 according to certain example embodiments. Specifically, FIG. 8A shows a perspective view of the subassembly 1193. FIG. 8B shows a top view of the subassembly 1193 with the mounting accessory 1190-1 disengaged from the adapter 510-1. Referring to FIGS. 1 through 11B, the subassembly 1193 (a type of luminaire assembly that is independent of the luminaire assembly 199 of FIG. 1 or can be disposed in the can 103 of the luminaire assembly 199 of FIG. 1) includes an enclosure top 1111, the adapter 610 of FIGS. 6A through 6D, and two mounting accessories 1190 (mounting accessory 1190-1 and mounting accessory 1190-2). The mounting accessories 690 (mounting accessory 690-1 and mounting accessory 690-2) of the adapter 610 are shown in an unlocked position (default) position. However, coupling features 1138 (substantially similar to the coupling features 938 of FIG. 9 above) are also shown. Specifically coupling feature 1138-1 can be used to put mounting accessory 690-1 in a locked position, and coupling feature 1138-2 can be used to put mounting accessory 690-2 in a locked position.

The two mounting accessories 1190 are configured to be removably coupled to the two additional adapters 510 (in this case, additional adapter 510-1 and additional adapter 510-2) of the adapter 610. Specifically, the mounting accessory 1190-1 couples to (becomes engaged with) the one end of the additional adapter 510, and the mounting accessory 1190-2 couples to (becomes engaged with) the opposite end of the additional adapter 510. The additional adapter 510 is disposed in the recessed area 680.

The mounting accessories 1190 are each configured substantially similar to the mounting accessories 390 of FIGS. 3A and 3B above. For example, mounting accessory 1190-1 is configured as a spring bracket that includes a base 1125-1, a back wall 1123-1, a spring 1122-1, and a bracket 1121-1. The base 1125-1 has a tab 1126-1 that extends upward at its proximal end therefrom, while the distal end of the tab 1126-1 is joined with the base 1125-1. This makes the tab 1126-1 in the shape of a wedge when the tab 1126-1 is in a default position. The base 1125-1, the back wall 1123-1, the spring 1122-1, the bracket 1121-1, and the tab 1126-1 of the mounting accessory 1190-1 are substantially similar to the base 325-1, the back wall 323-1, the spring 322-1, the bracket 321-1, and the tab 326-1 of the mounting accessory 390-1, with some minor differences.

For example, the length of the base 1125-1 of the mounting accessory 1190-1 in this case is greater than the length of base 325-1 of the mounting accessory 390-1. As another example, the distance between the proximal end of the tab 1126-1 and the back wall 1123-1 of the mounting accessory 1190-1 is greater than the distance between the proximal end of the tab 326-1 and the back wall 323-1 of the mounting accessory 390-1. Differences such as these notwithstanding, each of components of the mounting accessory 1190-1 are functionally equivalent to the corresponding components of the mounting accessory 390-1. The base 1125-2, the back wall 1123-2, the spring 1122-2, the bracket 1121-2, and the tab 1126-2 of the mounting accessory 1190-2 are identical to the base 1125-1, the back wall 1123-1, the spring 1122-1, the bracket 1121-1, and the tab 1126-1 of the mounting accessory 1190-1.

The adapters 510 in FIGS. 11A and 11B are the same as what is described above with respect to FIGS. 6A and 6B. For example, the opening 671-1 in the body 660 at the recessed area 680 is rectangular-shaped, and its proximal side serves functionally as a stop for the tab 1126-1 of the mounting accessory 1190-1. Similarly, opening 671-2 in the body 660 at the recessed area 680 is rectangular-shaped, and its proximal side serves functionally as a stop for the tab 1126-2 of the mounting accessory 1190-2. As another example, the mounting accessory 1190-1 is disposed between the body 660 in the recessed area 680 and the protrusion 639-1 that extends from the bottom surface of the body 660, the mounting accessory 1190-2 is disposed between the body 660 in the recessed area 680 and the protrusion 639-2 that extends from the bottom surface of the body 660. Each mounting accessory 1190 can be inserted into and removed from the adapters 510 without the use of tools.

The configuration of the adapter 610 in FIGS. 11A and 11B provides flexibility in terms of the type of installation required. If remodeler mounting is required, then the coupling features 1138 can be used to put the mounting accessories 690-1 and 690-2 in a locked position, which means that the mounting accessories 690 fall within the outer perimeter of the adapter 610. In such a case, the mounting accessory 1190 can be inserted into the additional adapters 510 of the adapter 610, which can be used to secure the enclosure top 1111 to a structure (e.g., a ceiling). Alternatively, if direct mounting is required, then the coupling features 1138 and the mounting assemblies 1190 can be removed, which allows the mounting accessories 690 to secure the enclosure top 1111 to a structure (e.g., the can 103).

FIG. 12 shows yet another subassembly 1292 according to certain example embodiments. Referring to FIGS. 1 through 12, the subassembly 1292 of FIG. 12 shows a heat sink 1212 of an existing recessed luminaire that has been modified. Specifically, two adapters 1210 in the form of loop and rail systems are coupled to (e.g., welded, fastened with independent coupling features (e.g., rivets, screws)) the top and side surfaces of the heat sink 1212. The adapters 1210 of FIG. 12 are substantially similar to the adapters 110 of FIGS. 2A through 5B. Specifically, adapter 1210-1 includes an end plate 1255-1, side rail 1251-L1 and side rail 1251-R1. Similarly, adapter 1210-2 includes an end plate 1255-2, side rail 1251-L2 and side rail 1251-R2. The adapters 1210 of the subassembly 1291 are configured to receive any of a number of different mounting accessories (mounting accessories 390, mounting accessories 490, mounting accessories 590).

FIG. 13 shows a subassembly 1391 of a luminaire that is configured to receive mounting accessories according to certain example embodiments. Referring to FIGS. 1 through 13, the subassembly 1391 (a type of luminaire assembly that is independent of the luminaire assembly 199 of FIG. 1 or can be disposed in the can 103 of the luminaire assembly 199 of FIG. 1) includes an enclosure top 1311 and two example adapters 1310 (adapter 1310-1 and adapter 1310-2) in the form of loop and rail assemblies, where each adapter 1310 is coupled to the side of the enclosure top 1311. The two adapters 1310 are configured identically to each other, and the two adapters 1310 in this example are positioned equidistantly from each other around the outer perimeter of the enclosure top 1311. Also, each adapter 1310 is configured to receive any of a number of different mounting accessories, as discussed below with respect to FIGS. 14 through 16.

Each adapter 1310 is a loop and rail assembly that is integrated into a single piece and is vertically oriented with respect to the enclosure top 1311. Specifically, the adapter 1310-1 has an end plate 1355-1 that abuts against the outer side wall of the enclosure top 1311. The end plate 1355-1 extends above the top surface of the enclosure top 1311 and has an aperture 1357-1 (e.g., a slot) that traverses therethrough. The aperture 1357-1 is positioned on the end plate 1357-1 so that the bottom of the aperture is substantially aligned with the top surface of the enclosure top 1311. One side of the end plate 1357-1 is manipulated (e.g., bent) to form the side rail 1351-L1, which extends along the height of the end plate 1357-1. The opposite side of the end plate 1357-1 is similarly manipulated (e.g., bent) to form the side rail 1351-R1, which extends along the height of the end plate 1357-1.

The adapter 1310-2 has an end plate 1355-2 that abuts against the outer side wall of the enclosure top 1311. The end plate 1355-2 extends above the top surface of the enclosure top 1311 and has an aperture 1357-2 (e.g., a slot) that traverses therethrough. The aperture 1357-2 is positioned on the end plate 1357-2 so that the bottom of the aperture is substantially aligned with the top surface of the enclosure top 1311. One side of the end plate 1357-2 is manipulated (e.g., bent) to form the side rail 1351-L2, which extends along the height of the end plate 1357-2. The opposite side of the end plate 1357-2 is similarly manipulated (e.g., bent) to form the side rail 1351-R2, which extends along the height of the end plate 1357-2. The side rails 1351, end plates 1355, and apertures 1357 of the adapters 1310 can be substantially equivalent (e.g., functionally, structurally, configurably) to the side rails 251, end plates 255, and apertures 257 of the adapters 210 discussed above with respect to FIGS. 2A through 5B.

FIG. 14 shows a subassembly 1479 that includes mounting accessories 1490 using the subassembly 1391 of FIG. 13 according to certain example embodiments. Referring to FIGS. 1 through 14, there are two mounting accessories 1490 in the subassembly 1479 of FIG. 14. The mounting accessories 1490 of the subassembly 1479 (a type of luminaire assembly that is independent of the luminaire assembly 199 of FIG. 1 or can be disposed in the can 103 of the luminaire assembly 199 of FIG. 1) of FIG. 14 are designed to couple to and decouple from the adapters 1310 of the subassembly 1391. Mounting accessory 1490-1 is removably coupled to the adapter 1310-1, and mounting accessory 1490-2 is removably coupled to the adapter 1310-2.

The mounting accessory 1490-1 can include multiple components having any of a number of configurations. In this example, the mounting accessory 1490-1 is configured as a spring bracket that includes a base 1425-1, a spring 1422-1 (sometimes called a mousetrap spring), and a bracket 1421-1. The coil portion of the spring 1422-1 is disposed in an aperture 1424-1 (e.g., a slot, a loop) in the base 1425-1, while the ends of the spring 1422-1 are coupled to and/or integrated with the bracket 1421-1. The sides of the base 1425-1 are configured to slide within the side rails 1351 of the adapter 1310-1. Also, the tab 1426-1 that protrudes outward from the base 1425-1 engages with the aperture 1357-1 of the adapter 1310-1.

Similarly, the mounting accessory 1490-2 can include multiple components having any of a number of configurations. In this example, the mounting accessory 1490-2 is configured as a spring bracket that includes a base 1425-2, a spring 1422-2 (sometimes called a mousetrap spring), and a bracket 1421-2. The coil portion of the spring 1422-2 is disposed in an aperture 1424-2 (e.g., a slot, a loop) in the base 1425-2, while the ends of the spring 1422-2 are coupled to and/or integrated with the bracket 1421-2. The sides of the base 1425-2 are configured to slide within the side rails 1351 of the adapter 1310-2. Also, the tab 1426-2 that protrudes outward from the base 1425-2 engages with the aperture 1357-2 of the adapter 1310-2.

In this case, the mounting accessory 1490-1 and the mounting accessory 1490-2 are configured the same as each other. Also, the bases 1425, the tabs 1426, the apertures 1424, the springs 1422, and the brackets 1421 of the mounting accessories 1490 of FIG. 14 can be substantially equivalent (e.g., functionally, structurally, configurably) to the bases 325, the tabs 326, the apertures 324, the springs 322, and the brackets 321 of the mounting accessories 1490 discussed above with respect to FIGS. 3A and 3B.

FIG. 15 shows another subassembly 1579 that includes mounting accessories 1590 using the subassembly of FIG. 13 according to certain example embodiments. Referring to FIGS. 1 through 15, there are two mounting accessories 1590 in the subassembly 1579 of FIG. 15. The mounting accessories 1590 of the subassembly 1579 (a type of luminaire assembly that is independent of the luminaire assembly 199 of FIG. 1 or can be disposed in the can 103 of the luminaire assembly 199 of FIG. 1) of FIG. 15 are designed to couple to and decouple from the adapters 1310 of the subassembly 1391. Mounting accessory 1590-1 is removably coupled to the adapter 1310-1, and mounting accessory 1590-2 is removably coupled to the adapter 1310-2.

The mounting accessory 1590-1 can include multiple components having any of a number of configurations. In this example, the mounting accessory 1590-1 is configured as a blade that includes a base 1525-1, a back wall 1523-1, and a blade 1531-1. A tab 1526-1 protrudes from the base 1525-1 and is configured to engage the aperture 1357-1 of the adapter 1310-1. Each end of the blade 1531-1 has securing features 1532, in this case in the form of protrusions. Specifically, the left end of the blade 1531-1 has securing features 1532-L1, and the right end of the blade 1531-1 has securing features 1532-R1. The blade 1531-1 and the securing features 1532 are non-planar in this example. The blade 1531-1 is coupled to the back wall 1523-1 using one or more coupling features 1533 (e.g., rivets). The back wall 1523-1 is L-shaped, and the base 1525-1 extends substantially perpendicular and downward from a distal end of the back wall 1523-1.

Similarly, the mounting accessory 1590-2 is configured as a blade that includes a base 1525-2, a back wall 1523-2, and a blade 1531-2. A tab 1526-2 protrudes from the base 1525-2 and is configured to engage the aperture 1357-2 of the adapter 1310-2. Each end of the blade 1531-2 has securing features 1532, in this case in the form of protrusions. Specifically, the left end of the blade 1531-2 has securing features 1532-L1, and the right end of the blade 1531-2 has securing features 1532-R1. The blade 1531-2 and the securing features 1532 are non-planar in this example. The blade 1531-2 is coupled to the back wall 1523-2 using one or more coupling features 1533 (e.g., rivets). The back wall 1523-2 is L-shaped, and the base 1525-2 extends substantially perpendicular and downward from a distal end of the back wall 1523-2.

In this case, the mounting accessory 1590-1 and the mounting accessory 1590-2 are configured the same as each other. Also, the bases 1525, the tabs 1526, the securing features 1532, the coupling features 1533, the back wall 1523-2, and the blades 1531 of the mounting accessories 1590 of FIG. 15 can be substantially equivalent (e.g., functionally, structurally, configurably) to the bases 325, the tabs 326, the back walls 323, the securing features 432, the coupling features 433, and the blades 431 of the mounting accessories 490 discussed above with respect to FIGS. 4A and 4B.

FIG. 16 shows yet another subassembly 1679 that includes mounting accessories 1690 using the subassembly of FIG. 13 according to certain example embodiments. Referring to FIGS. 1 through 16, there are two mounting accessories 1690 in the subassembly 1679 of FIG. 16. The mounting accessories 1690 of the subassembly 1679 (a type of luminaire assembly that is independent of the luminaire assembly 199 of FIG. 1 or can be disposed in the can 103 of the luminaire assembly 199 of FIG. 1) of FIG. 16 are designed to couple to and decouple from the adapters 1310 of the subassembly 1391. Mounting accessory 1690-1 is removably coupled to the adapter 1310-1, and mounting accessory 1690-2 is removably coupled to the adapter 1310-2.

The mounting accessory 1690-1 can include multiple components having any of a number of configurations. In this example, the mounting accessory 1690-1 is configured as a torsion spring assembly that includes a base 1625-1, a tab 1626-1, a back wall 1623-1, and a torsion spring 1641-1. The torsion spring 1641-1 is directly or indirectly coupled to the back wall 1623-1 using one or more coupling features. For example, in this case, the torsion spring 1641-1 is indirectly coupled to the back wall 1623-1 using one or more coupling features (e.g., rivets, screws) that each traverse an aperture (a form of coupling feature) in the back wall 1623-1 and an aperture in a clamp, which secures part of the torsion spring 1641-1.

Similarly, the mounting accessory 1690-2 is configured as a torsion spring assembly that includes a base 1625-2, a tab 1626-2, a back wall 1623-2, and a torsion spring 1641-2. The torsion spring 1641-2 is directly or indirectly coupled to the back wall 1623-2 using one or more coupling features. For example, in this case, the torsion spring 1641-2 is indirectly coupled to the back wall 1623-2 using one or more coupling features (e.g., rivets, screws) that each traverse an aperture (a form of coupling feature) in the back wall 1623-2 and an aperture in a clamp, which secures part of the torsion spring 1641-2.

In this case, the mounting accessory 1690-1 and the mounting accessory 1690-2 are configured the same as each other. Also, the bases 1625, the tabs 1626, the back walls 1623, and the torsion springs 1641 of the mounting accessories 1690 of FIG. 16 can be substantially equivalent (e.g., functionally, structurally, configurably) to the bases 325, the tabs 326, the back walls 323, and the torsion springs 541 of the mounting accessories 590 discussed above with respect to FIGS. 5A and 5B.

Example embodiments can be used to provide one or more mounting accessories for a luminaire (e.g., a recessed light fixture) or a luminaire assembly. Example embodiments can be used to secure a luminaire with respect to a structure (e.g., a ceiling, another component of a luminaire assembly). Example mounting accessories (or portions thereof) can be installed, removed, and/or changed from a recessed luminaire (or any other type of luminaire) without the use of a tool (e.g., a screwdriver, a wrench). Example embodiments can also provide flexibility as to how a luminaire can be secured in the field at the time of installation. Example embodiments can be used with recessed luminaires having any of a number of mounting systems and features. Example embodiments can be used in new installations of recessed luminaires as well as retrofitting or replacing existing luminaires. Example embodiments also provide a number of other benefits. Such other benefits can include, but are not limited to, increased ease of maintenance, greater ease of use, and compliance with industry standards that apply to luminaires.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

The invention claimed is:

1. A luminaire comprising:

an enclosure top, an end plate that is located at a side of the enclosure top, wherein the end plate has an aperture that traverses therethrough;

a pair of side rails located on the enclosure top adjacent the end plate; and a mounting accessory including a base, wherein the base includes at least one depressable tab, wherein the base and depressable tab are configured to slide through the aperture of the end plate, wherein as the base and depressable tab slide through the aperture of the end plate, the base engages the pair of side rails, and the depressable tab engages the end plate to lock the mounting accessory to the enclosure top, wherein the depressable tab is configured to be depressed to unlock the mounting accessory from the enclosure top, and wherein the mounting accessory is configured to secure the enclosure top to a structure.

2. The luminaire assembly of claim 1, wherein the pair of side rails are integral to the enclosure top.

3. The luminaire of claim 1, wherein the mounting accessory comprises a spring and a bracket, wherein the bracket contacts the structure.

4. The luminaire of claim 1, wherein the mounting accessory comprises a blade, wherein the blade contacts the structure.

5. The luminaire of claim 1, wherein the mounting accessory comprises a torsion spring, wherein the torsion spring contacts the structure.

6. The luminaire assembly of claim 1, wherein the mounting accessory is coupled to the enclosure top and decoupled from the enclosure top without use of tools.

7. The luminaire of claim 1, wherein the mounting accessory comprises a bracket, wherein the bracket contacts the structure.

8. The luminaire of claim 1, wherein the mounting accessory is removable from the enclosure top by depressing the depressable tab and sliding the base and depressed depressable tab back through the aperture of the end plate.

* * * * *